US007336926B2

(12) United States Patent
Noda et al.

(10) Patent No.: US 7,336,926 B2
(45) Date of Patent: Feb. 26, 2008

(54) COMMUNICATION DEVICE AND METHOD

(75) Inventors: Takuro Noda, Tokyo (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 572 days.

(21) Appl. No.: 10/468,275

(22) PCT Filed: Nov. 29, 2002

(86) PCT No.: PCT/JP02/12484

§ 371 (c)(1),
(2), (4) Date: Aug. 18, 2003

(87) PCT Pub. No.: WO03/053008

PCT Pub. Date: Jun. 26, 2003

(65) Prior Publication Data

US 2004/0214524 A1 Oct. 28, 2004

(30) Foreign Application Priority Data

Dec. 17, 2001 (JP) ............................ 2001-382896
Feb. 27, 2002 (JP) ............................ 2002-051264
Sep. 17, 2002 (JP) ............................ 2002-269951

(51) Int. Cl.
*H04B 7/00* (2006.01)

(52) U.S. Cl. ...................... 455/41.2; 455/417; 455/567

(58) Field of Classification Search ............... 455/41.1, 455/41.2
See application file for complete search history.

(56) References Cited

U.S. PATENT DOCUMENTS 5,440,559 A * 8/1995 Gaskill ....................... 370/314
5,602,854 A * 2/1997 Luse et al. .................. 370/313
5,940,509 A * 8/1999 Jovanovich et al. ........ 713/191
6,002,930 A * 12/1999 Sadrozinski et al. ..... 455/432.3
6,088,730 A * 7/2000 Kato et al. .................. 709/227
6,141,564 A * 10/2000 Bruner et al. ............... 455/558
6,694,143 B1 * 2/2004 Beamish et al. ......... 455/456.1
6,697,638 B1 * 2/2004 Larsson et al. .......... 455/553.1
6,717,516 B2 * 4/2004 Bridgelall ................ 340/572.1
6,754,484 B1 * 6/2004 Hiltunen et al. ......... 455/412.1
6,857,072 B1 * 2/2005 Schuster et al. ............ 713/160

(Continued)

FOREIGN PATENT DOCUMENTS

JP 2000-148637 5/2000

(Continued)

OTHER PUBLICATIONS

Office Action issued in JP 2002-269951 (2 pages).

*Primary Examiner*—Matthew Anderson
*Assistant Examiner*—Minh Dao
(74) *Attorney, Agent, or Firm*—Finnegan, Henderson, Farabow, Garrett & Dunner, L.L.P.

(57) ABSTRACT

The present invention relates to a communication apparatus and method for controlling a communicating device by sending predetermined command data without directly operating the communicating device. In step S6, a PDA sends command data described in XML format concerning the start of a Bluetooth function to a personal computer via a reader/writer. In steps S24 and S25, the reader/writer receives the command data sent from the PDA, and requests the personal computer to start the Bluetooth-function. In steps S42 and S43, the personal computer starts the Bluetooth communication function based on the request from the reader/writer. The present invention is applicable to a wireless communication apparatus.

12 Claims, 24 Drawing Sheets

U.S. PATENT DOCUMENTS

| | | | | |
|---|---|---|---|---|
| 6,895,215 | B2 * | 5/2005 | Uhlmann | 455/3.01 |
| 7,042,988 | B2 * | 5/2006 | Juitt et al. | 379/88.17 |
| 2001/0053947 | A1 * | 12/2001 | Lenz et al. | 700/117 |

FOREIGN PATENT DOCUMENTS

| | | |
|---|---|---|
| JP | 2001-156704 | 6/2001 |
| JP | 2001-156723 | 6/2001 |
| JP | 2001-189722 | 7/2001 |
| JP | 2002-16988 | 1/2002 |
| JP | 2002-351766 | 12/2002 |

* cited by examiner

FIG. 4A

| | | | | | | | | | | | | | | |
|---|---|---|---|---|---|---|---|---|---|---|---|---|---|---|
| 00 | 00 | 00 | 00 | 00 | 00 | B2 | 4D | LEN | PD0 | PD1 | ... | PDn | CRC | CRC |
| Preamble | | | | | | Sync Code | | Len | Packet Data | | | | CRC16 | |

(LEN)bytes

FIG. 4B

| | | | | | | | | | | | | | | | | |
|---|---|---|---|---|---|---|---|---|---|---|---|---|---|---|---|---|
| PD0 | PD1 | PD2 | PD3 | PD4 | PD5 | PD6 | PD7 | PD8 | PD9 | PD10 | PD11 | PD12 | PD13 | PD14 | ... | PDn |
| FF | | | | | | | | | | | | | | | | |
| System Dependent Command | System Code | | IDm | | | | | | | | tlabel | Command Code | Response Code | Command Data | | |

FIG. 5A

```
command:
<setInterfaceState>
    <interfaceName>bluetooth</interfaceName>
    <interfaceState>on</interfaceState>
</setInterfaceState>
```

FIG. 5B

```
response:
<setInterfaceStateResponse/>
```

FIG. 8A

```
command:
<setPowerState>
    <powerState>on</powerState>
</setPowerState>
```

FIG. 8B

```
response:
<setPowerStateResponse/>
```

FIG. 9A

```
command:
<setServiceState>
    <serviceName>infra</serviceName>
    <serviceState>on</serviceState>
</setServiceState>
```

FIG. 9B

```
response:
<setServiceStateResponse/>
```

FIG. 11A

```
command:
<getInterfaceState>
    <interfaceName>bluetooth</interfaceName>
</getInterfaceName>
```

FIG. 11B

```
response:
<getInterfaceStateResponse/>
    <interfaceName>bluetooth</interfaceName>
    <interfaceState>on</interfaceState>
</getInterfaceStateResponse>
```

FIG. 12A

```
command:
<getPowerState/>
```

FIG. 12B

```
response:
<getPowerStateResponse/>
    <powerState>on</powerState>
</setPowerStateResponse>
```

FIG. 13A

```
command:
<getServiceState>
     <serviceName>infra</serviceName>
</getServiceName>
```

FIG. 13B

```
response:
<getServiceStateResponse/>
     <serviceName>infra</serviceName>
     <serviceState>on</serviceState>
</getServiceStateResponse>
```

FIG. 22

```
<accessPoint>
    <title>local-net</title>
    <802.11b>
        <essid>0000</essid>
        <wepkey>sampl</wepkey>
    </802.11b>
</accessPoint>
```

FIG. 26

```
<localNetwork>
    <title>local-net</title>
    <802.11b>
        <essid>0000</essid>
        <wepkey>sampl</wepkey>
    </802.11b>
</localNetwork>
```

COMMUNICATION DEVICE AND METHOD

TECHNICAL FIELD

The present invention relates to communication apparatuses and methods. More particularly, the invention relates to a communication apparatus suitable for use in performing data communication by being wirelessly connected to another electronic device, and also to a communication method.

BACKGROUND ART

As techniques for wirelessly connecting a plurality of electronic devices, IEEE (Institute of Electrical and Electronics Engineers) 802.11b and Bluetooth™ are known.

For example, in Bluetooth communication, a device detecting message for detecting peripheral devices is broadcasted from a device, which is referred to as a "master", for controlling communication. From a response message sent from a device (slave) that has received the device detecting message, the master is able to detect a device with which the master is able to communicate and to also obtain Bluetooth information concerning that device.

For detecting a device with which the master is able to communicate, not only the master device, but also a slave device that can communicate with the master device, has to start the Bluetooth communication functions.

However, in order to start the Bluetooth function of the slave device, the user must directly operate the slave device. Accordingly, for example, when the user who possesses device A and device B transfers data from device A to device B by Bluetooth communication, the user has to start the Bluetooth communication functions of device A and device B by directly operating the individual devices. The operation is thus cumbersome and complicated.

DISCLOSURE OF INVENTION

In view of the above background, it is an object of the present invention is to control devices in which wireless communication is not established by sending predetermined command data instead of directly operating such devices.

A first communication apparatus of the present invention includes: detection means for detecting the presence of an information recording medium in which information including at least identification information of a different communication apparatus is recorded; and sending means for sending predetermined command data to the information recording medium detected by the detection means via an electromagnetic wave.

The predetermined command data may be command data for controlling a predetermined function of the different communication apparatus or command data for obtaining the state of the predetermined function.

The first communication apparatus may further include receiving means for receiving response data sent from the information recording medium in response to the predetermined command data.

The response data may include information concerning the state of a predetermined function of the different communication apparatus.

The predetermined command data may be data described in XML format.

The first communication apparatus may further include wireless communication means for performing wireless communication with the different communication apparatus according to a predetermined wireless communication standard, which is different from the electromagnetic wave.

The information recording medium may be an IC card.

A first communication method of the present invention includes: a detection step of detecting the presence of an information recording medium in which information including at least identification information of a different communication apparatus is recorded; and a sending step of sending predetermined command data to the information recording medium detected by processing of the detection step via an electromagnetic wave.

A program recorded in a first recording medium of the present invention includes: a detection step of detecting the presence of an information recording medium in which information including at least identification information of the different communication apparatus is recorded; and a sending step of sending predetermined command data to the information recording medium detected by processing of the detection step via an electromagnetic wave.

A first program of the present invention allows a computer to execute: a detection step of detecting the presence of an information recording medium in which information including at least identification information of a different communication apparatus is recorded; and a sending step of sending predetermined command data to the information recording medium detected by processing of the detection step via an electromagnetic wave.

According to the first communication apparatus, method, and program of the present invention, the presence of an information recording medium including at least identification information of a different communication apparatus is detected, and predetermined command data is sent to the detected information recording medium by an electromagnetic wave.

A second communication apparatus of the present invention includes: first obtaining means for obtaining a storage medium in which information including at least identification information of a different communication apparatus is stored from the different communication apparatus; reading means for reading the information stored in the storage medium obtained by the first obtaining means; writing means for writing predetermined command data into the storage medium obtained by the first obtaining means; and moving means for moving the storage medium in which the predetermined command data is written by the writing means to the different communication apparatus.

The predetermined command data may be command data for controlling a predetermined function of the different communication apparatus or command data for obtaining the state of the predetermined function.

The second communication apparatus may further include second obtaining means for obtaining the storage medium in which information concerning the state of a predetermined function of the different communication apparatus is stored. The reading means may read the information concerning the state of the predetermined function stored in the storage medium obtained by the second obtaining means.

The predetermined command data may be data described in XML format.

The storage medium may be a memory card.

A second communication method of the present invention includes: a reading step of obtaining a storage medium in which information including at least identification information of a different communication apparatus is stored from the different communication apparatus, and reading the information stored in the storage medium; a writing step of writing predetermined command data into the storage medium; and a moving step of moving the storage medium in which the predetermined command data is written by processing of the writing step to the different communication apparatus.

A program recorded in a second recording medium of the present invention includes: a reading step of obtaining a storage medium in which information including at least identification information of a different communication apparatus is stored from the different communication apparatus, and reading the information stored in the storage medium; a writing step of writing predetermined command data into the storage medium; and a moving step of moving the storage medium in which the predetermined command data is written by processing of the writing step to the different communication apparatus.

A second program of the present invention allows a computer to a predetermined wireless communication standard to execute: a reading step of obtaining a storage medium in which information including at least identification information of a different communication apparatus is stored from the different communication apparatus, and reading the information stored in the storage medium; a writing step of writing predetermined command data into the storage medium; and a moving step of moving the storage medium in which the predetermined command data is written by processing of the writing step to the different communication apparatus.

According to the second communication apparatus, method, and program of the present invention, a storage medium in which information including at least identification information of a different communication apparatus is stored is obtained from the different communication apparatus, and the information stored in the storage medium is read. Predetermined command data is written into the storage medium, and the storage medium in which the predetermined command data is written is moved to the different communication apparatus.

A third communication apparatus of the present invention includes: first wireless communication means for performing first wireless communication with a different communication apparatus via radio wave; second wireless communication means for performing second wireless communication via an infrared with the different communication apparatus located in proximity the communication apparatus; obtaining means for obtaining setting information of the different communication apparatus from the different communication apparatus by the second wireless communication performed by the second wireless communication means; setting means for performing setting concerning network connection based on the setting information obtained by the obtaining means; and connection means for connecting to a network including the different communication apparatus by the first wireless communication performed by the first wireless communication means by using the setting information set by the setting means.

The setting information may include identification information of the network and information concerning a predetermined private key used for encrypting content to be used in the first wireless communication.

The setting information may be data described in XML format.

A third communication method of the present invention: a first wireless communication control step of controlling first wireless communication with a different communication apparatus via radio wave; a second wireless communication control step of controlling second wireless communication via an infrared with the different communication apparatus located in proximity with the communication apparatus; an obtaining control step of controlling the obtaining of setting information of the different communication apparatus from the different communication apparatus by the second wireless communication controlled by processing of the second wireless communication control step; a setting step of performing setting concerning network connection based on the setting information obtained by control processing of the obtaining control step; and a connection step of connecting to a network including the different communication apparatus by the first wireless communication controlled by processing of the first wireless communication control step by using the setting information set by processing of the setting step.

A program of a third recording medium of the present invention includes: a first wireless communication control step of controlling first wireless communication with a different communication apparatus via radio wave; a second wireless communication control step of controlling second wireless communication via an infrared with the different communication apparatus located in proximity with the communication apparatus; an obtaining control step of controlling the obtaining of setting information of the different communication apparatus from the different communication apparatus by the second wireless communication controlled by processing of the second wireless communication control step; a setting step of performing setting concerning network connection based on the setting information obtained by control processing of the obtaining control step; and a connection step of connecting to a network including the different communication apparatus by the first wireless communication controlled by processing of the first wireless communication control step by using the setting information set by processing of the setting step.

A third program of the present invention includes: a first wireless communication control step of controlling first wireless communication with a different communication apparatus via radio wave; a second wireless communication control step of controlling second wireless communication via an infrared with the different communication apparatus located in proximity with the communication apparatus; an obtaining control step of controlling the obtaining of setting information of the different communication apparatus from the different communication apparatus by the second wireless communication controlled by processing of the second wireless communication control step; a setting step of performing setting concerning network connection based on the setting information obtained by control processing of the obtaining control step; and a connection step of connecting to a network including the different communication apparatus by the first wireless communication controlled by processing of the first wireless communication control step by using the setting information set by processing of the setting step.

According to the third communication apparatus, method, and program of the present invention, first wireless communication is performed with a different communication apparatus via radio wave, and second wireless communication is performed via infrared with the different communication apparatus located in proximity with the communication apparatus. Setting information of the different communication apparatus is obtained from the different communication apparatus by the second wireless communication. Based on the setting information, setting concerning network connection is performed, and connection to a network including the different communication apparatus is established by the first wireless communication by using the setting information.

A fourth communication apparatus of the present invention includes: first wireless communication means for performing first wireless communication with a different communication apparatus via radio wave; second wireless communication means for performing second wireless communication via an infrared with the different communication apparatus located in proximity with the communication apparatus; supply means for supplying setting information to the different communication apparatus by the second wireless communication performed by the second wireless communication means; setting instruction means for allowing the different communication apparatus to perform setting concerning network connection based on the setting information supplied by the supply means; and connection means for connecting to a network including the different communication apparatus by the first wireless communication performed by the first wireless communication means by using the setting information set by the setting instruction means.

The setting information may include identification information of the network and information concerning a predetermined private key used for encrypting content to be used in the first wireless communication.

The setting information may be data described in XML format.

A fourth communication method of the present invention includes: a first wireless communication control step of controlling first wireless communication with a different communication apparatus via radio wave; a second wireless communication control step of controlling second wireless communication via an infrared with the different communication apparatus located in proximity with the communication apparatus; a supply control step of controlling the supply of setting information to the different communication apparatus by the second wireless communication controlled by processing of the second wireless communication control step; a setting instruction step of allowing the different communication apparatus to perform setting concerning network connection based on the setting information supplied by control processing of the supply control step; and a connection step of connecting to a network including the different communication apparatus by the first wireless communication controlled by processing of the first wireless communication control step by using the setting information set by processing of the setting instruction step.

A program of a fourth recording medium of the present invention includes: a first wireless communication control step of controlling first wireless communication with a different communication apparatus via radio wave; a second wireless communication control step of controlling second wireless communication via an infrared with the different communication apparatus located in proximity with the communication apparatus; a supply control step of controlling the supply of setting information to the different communication apparatus by the second wireless communication controlled by processing of the second wireless communication control step; a setting instruction step of allowing the different communication apparatus to perform setting concerning network connection based on the setting information supplied by control processing of the supply control step; and a connection step of connecting to a network including the different communication apparatus by the first wireless communication controlled by processing of the first wireless communication control step by using the setting information set by processing of the setting instruction step.

A fourth program of the present invention allows a computer to execute: a first wireless communication control step of controlling first wireless communication with a different communication apparatus via radio wave; a second wireless communication control step of controlling second wireless communication via an infrared with the different communication apparatus located in proximity with the communication apparatus; a supply control step of controlling the supply of setting information to the different communication apparatus by the second wireless communication controlled by processing of the second wireless communication control step; a setting instruction step of allowing the different communication apparatus to perform setting concerning network connection based on the setting information supplied by control processing of the supply control step; and a connection step of connecting to a network including the different communication apparatus by the first wireless communication controlled by processing of the first wireless communication control step by using the setting information set by processing of the setting instruction step.

According to the fourth communication apparatus, method, and program of the present invention, first wireless communication is performed with a different communication apparatus via radio wave, and second wireless communication is performed via an infrared with the different communication apparatus located in proximity with the communication apparatus. Setting information is supplied to the different communication apparatus by the second wireless communication. Based on this setting information, an instruction is given to perform setting concerning network connection, and connection to a network including the different apparatus is established by the first wireless communication by using the setting information set by the instruction.

BRIEF DESCRIPTION OF THE DRAWINGS

FIG. 4A illustrates an example of the structure of a data packet to be transmitted and received when Felica is used.

FIG. 4B illustrates an example of the structure of a data packet to be transmitted and received when Felica is used.

FIG. 5A illustrates an example of command data in XML format.

FIG. 5B illustrates an example of response data in response to command data in XML format.

FIG. 8A illustrates an example of set command data for controlling a predetermined function.

FIG. 8B illustrates an example of response data in response to the set command data shown in FIG. 8A.

FIG. 9A illustrates another example of set command data for controlling a predetermined function.

FIG. 9B illustrates an example of response data in response to the set command data shown in FIG. 9A.

FIG. 11A illustrates an example of get command data for obtaining the state of a predetermined function.

FIG. 11B illustrates an example of response data in response to the get command data shown in FIG. 11A.

FIG. 12A illustrates another example of get command data for obtaining the state of a predetermined function.

FIG. 12B illustrates an example of response data in response to the get command data shown in FIG. 12A.

FIG. 13A illustrates another example of get command data for obtaining the state of a predetermined function.

FIG. 13B illustrates an example of response data in response to the get command data shown in FIG. 13A.

FIG. 22 illustrates an example of wireless communication connection information.

FIG. 26 illustrates an example when a personal computer makes a connection request to a PDA in AdHoc mode.

BEST MODE FOR CARRYING OUT THE INVENTION

An embodiment of the present invention is described below with reference to the drawings.

Figure 1:
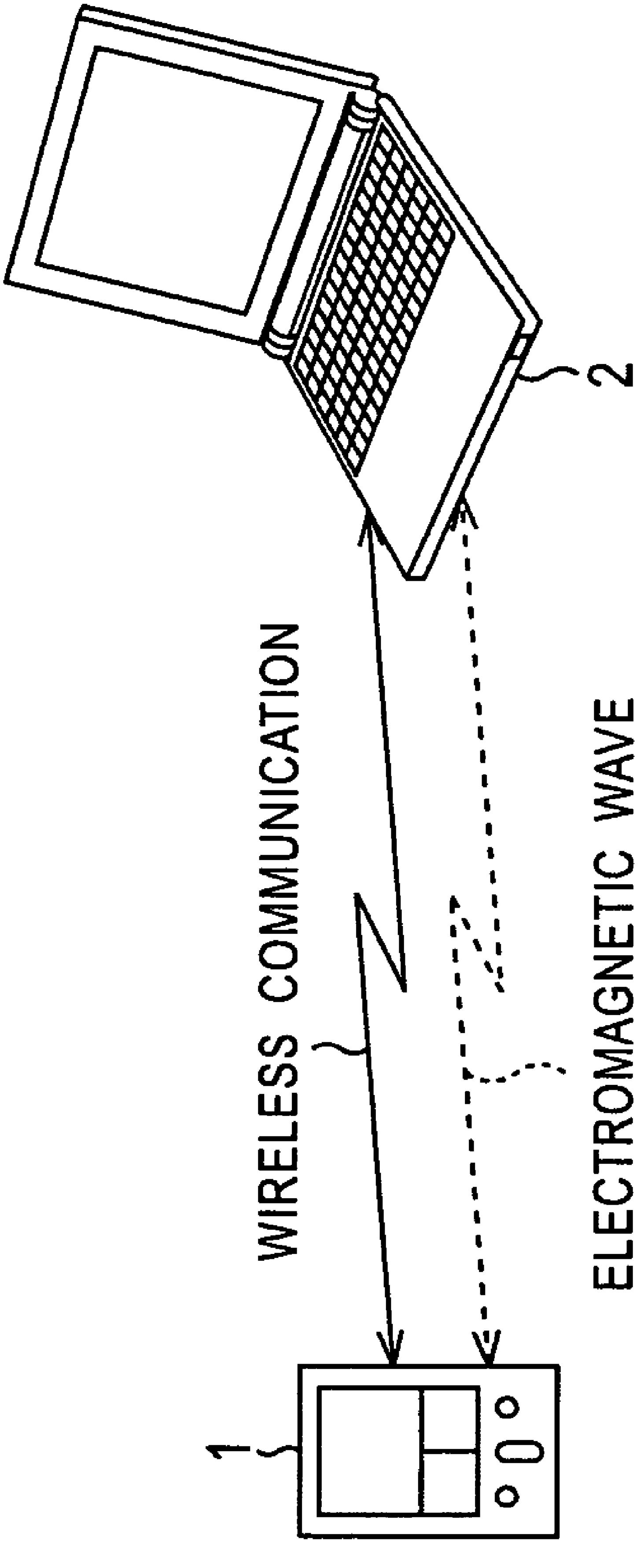
FIG. 1 illustrates the concept of wireless connection between a PDA and a personal computer according to an embodiment of the present invention.

FIG. 1 illustrates the concept of wireless communication between a PDA (Personal Digital Assistants) 1 and a personal computer 2 according to an embodiment of the present invention.

The PDA 1 and the personal computer 2 are adapted to send and receive various data with each other by performing wireless communication which is compliant to the Bluetooth standards of a wireless communication unit 21 (FIG. 2) and a wireless communication unit 41 (FIG. 3) integrated into the PDA 1 and the personal computer 2, respectively.

Figure 2:
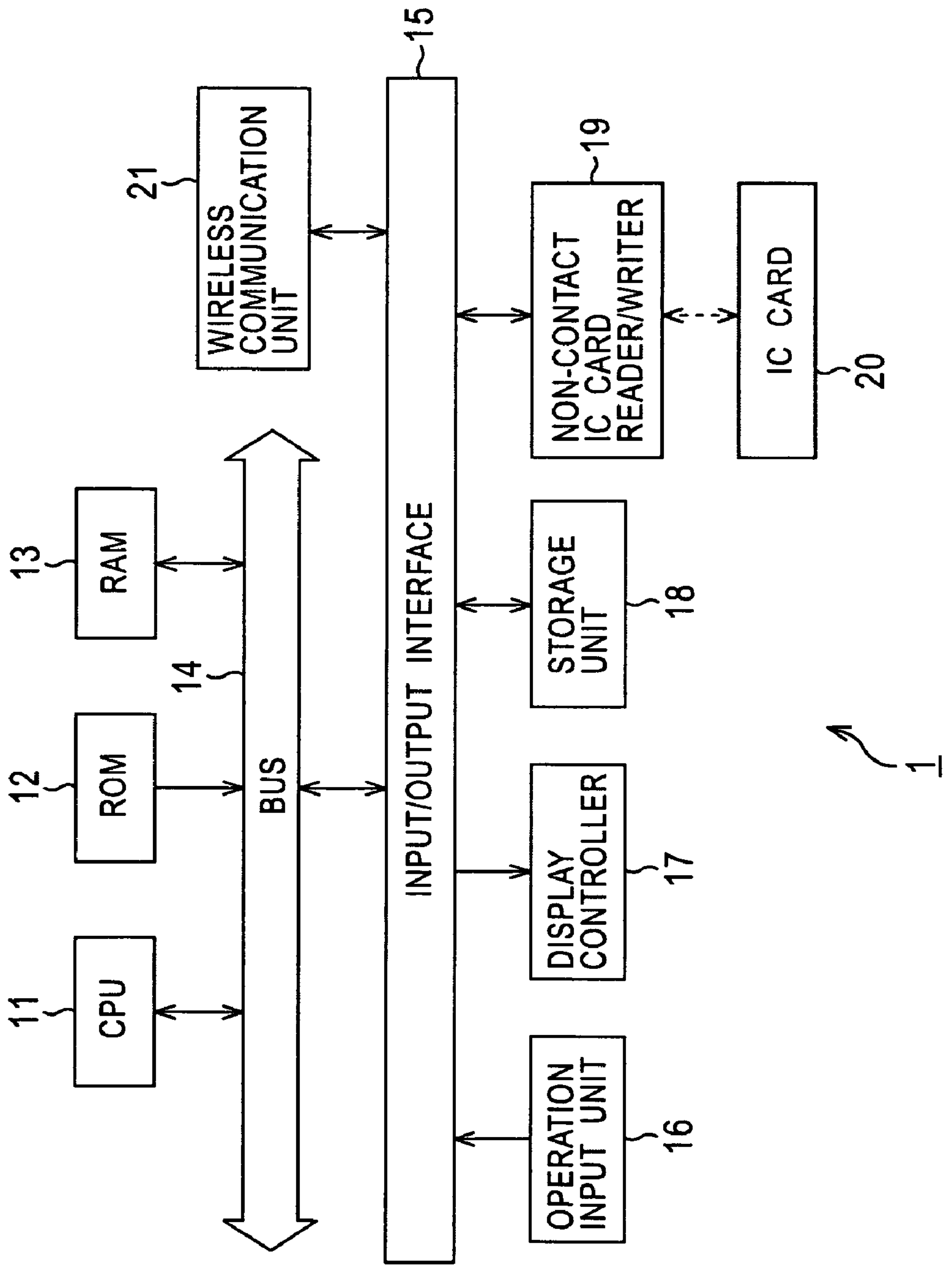
FIG. 2 is a block diagram illustrating an example of the configuration of the PDA shown in FIG. 1.
Figure 3:
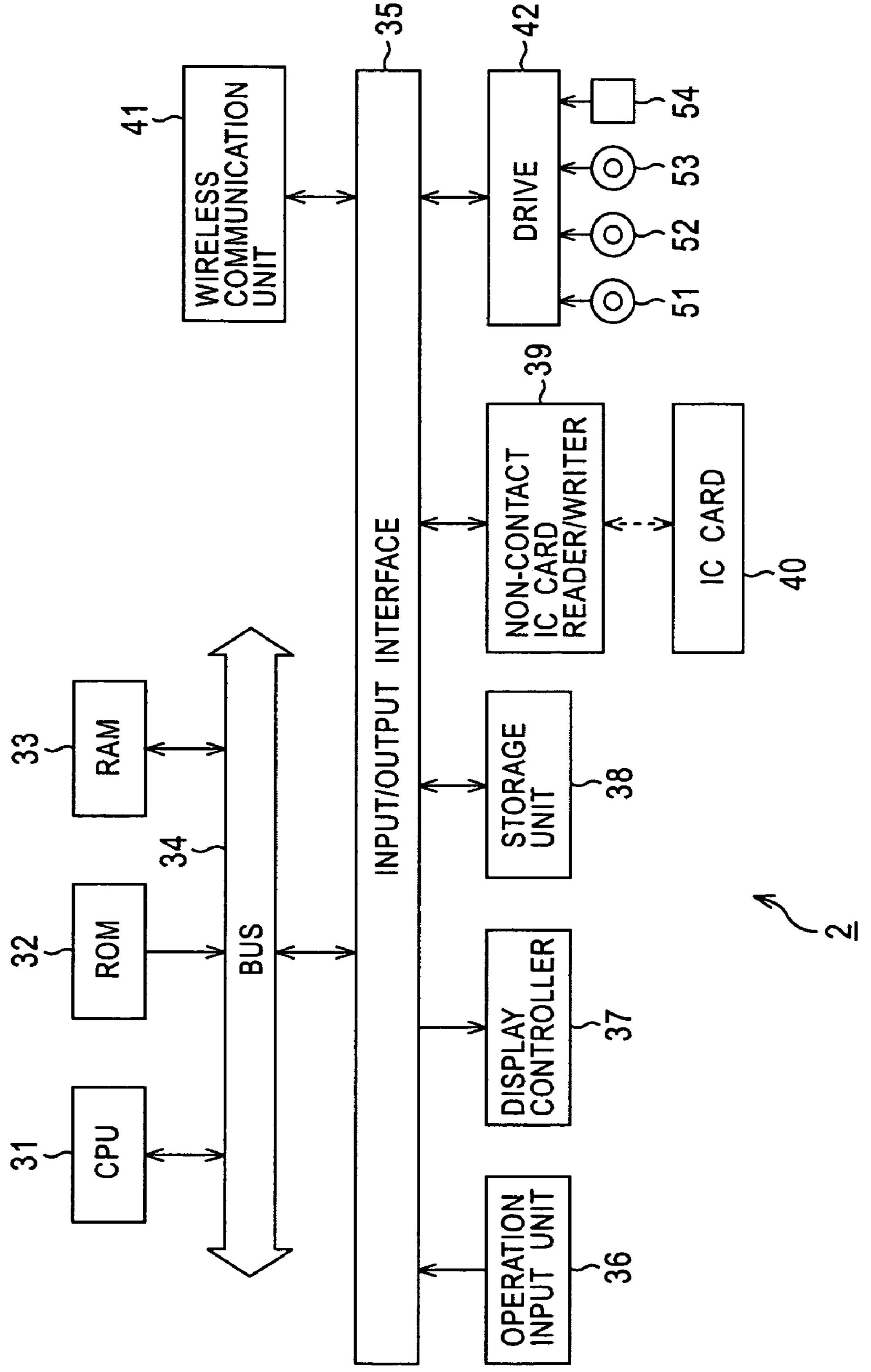
FIG. 3 is a block diagram illustrating an example of the configuration of the personal computer shown in FIG. 1.

The PDA 1 and the personal computer 2 are respectively provided with a non-contact IC card reader/writer 19 and a non-contact IC card reader/writer 39 for reading and writing various types of information from and into a non-contact IC card 20 (FIG. 2) and a non-contact IC card 40 (FIG. 3). The reader/writer 19 and the reader/writer 39 are also able to read or write various types of information from or into a reader/writer provided for another device. Accordingly, communication can be performed between the PDA 1 and the personal computer 2, not only by Bluetooth communication, but also by electromagnetic waves radiated from the reader/writer 19 and the reader/writer 39, as indicated by the one-dot-chain line arrows in FIG. 1.

FIG. 2 is a block diagram illustrating an example of the configuration of the PDA 1 shown in FIG. 1.

A CPU (Central Processing Unit) 11 executes various types of processing according to programs stored in a ROM (Read Only Memory) 12 and a storage unit 18. Programs and data executed by the CPU 11 are stored in a RAM (Random Access Memory) 13 when necessary. The CPU 11, the ROM 12, and the RAM 13 are connected with each other via a bus 14.

An input/output interface 15 is connected to the bus 14. An operation input unit 16 formed of an input device, such as a touch pad, a key, or a jog dial, for allowing the user to input operation commands, a display controller 17 for outputting video signals to an LCD (Liquid Crystal Display), which displays an operation screen, the storage unit 18 formed of, for example, a flash memory, for storing programs and various data are connected to the input/output interface 15.

Also, the non-contact IC card reader/writer 19 that communicates with the IC card 20 via electromagnetic waves, and the wireless communication unit 21 that communicates with the wireless communication unit 41 (FIG. 3) of the personal computer 2 by using a Bluetooth wireless communication function are connected to the input/output interface 15.

The non-contact IC card reader/writer 19 (hereinafter sometimes referred to as the "reader/writer 19") executes various types of processing based on a control signal supplied from the CPU 11 or response data sent from the IC card 20.

For example, the CPU 11 generates a control command to be sent to the IC card 20, and outputs it to the reader/writer 19 via the bus 14 and the input/output interface 15. The reader/writer 19 radiates a modulation wave in accordance with the command as an electromagnetic wave, and based on a change in the load on an antenna (not shown), the reader/writer 19 determines whether the IC card 20 or the IC card 40 of the personal computer 2 is located close to the reader/writer 19. The reader/writer 19 then sends and receives various data to and from the IC card located close to the reader/writer 19.

The reader/writer 19 also supplies data obtained by demodulating response data from the IC card 20 or the IC card 40 to the CPU 11 via the input/output interface 15 and the bus 14.

In the IC card 20, information concerning the Bluetooth device of the PDA 1 (Bluetooth device name and Bluetooth address) is recorded, and the recorded information is reported to the non-contact IC card reader/writer 19 according to an electromagnetic wave radiated from the non-contact IC card reader/writer 19.

FIG. 3 is a block diagram illustrating an example of the configuration of the personal computer 2 shown in FIG. 1. Basically, a CPU 31, a ROM 32, a RAM 33, a bus 34, an input/output interface 35, the non-contact IC card reader/writer 39, the IC card 40, and the wireless communication unit 41 are configured similarly to those of the PDA 1 shown in FIG. 1, and an explanation thereof is thus omitted.

An operation input unit 36 is formed of an input device, such as a keyboard, a mouse, a jog dial, a button, or a switch, for allowing the user to input operation commands. A display controller 37 outputs video signals to a CRT (Cathode Ray Tube) or an LCD which displays an operation screen. A storage unit 18 is formed of, for example, a hard disk drive, for storing programs and various data.

In addition to the operation input unit 36, the display controller 37, the storage unit 38, the non-contact IC card reader/writer 39, the IC card 40, and the wireless communication unit 41, a drive 42 for reading and writing data from and into recording media, such as a magnetic disk 51, an optical disc 52, a magneto-optical disk 53, and a semiconductor memory 54, is connected to the input/output interface 35.

Although in FIGS. 2 and 3 the reader/writer 19 and the reader/writer 39 are integrated into the PDA 1 and the personal computer 2, respectively, they may be disposed outside the casings of the PDA 1 and the personal computer 2. The names, such as the IC cards 20 and 40, are used for the sake of convenience, and an IC does not have to be on a card, and may be embedded in a seal or paper at the rear surface exhibiting an adhesive characteristic. As a function basically similar to the IC cards 20 and 40, for example, Felica (registered trade name) is available.

When the user positions the PDA 1 close to the personal computer 2, an electromagnetic wave is radiated from the non-contact IC card reader 19 of the PDA 1. Upon receiving this electromagnetic wave, the IC card 40 of the personal computer 2 provides the Bluetooth information recorded in the IC card 40 to the PDA 1. The PDA 1 is then able to identify only the personal computer 2 from Bluetooth devices located around the PDA 1 by using the obtained Bluetooth information of the personal computer 2.

As described above, the user of the PDA 1 is able to specify the communicating Bluetooth device by a simple operation, such as by positioning the PDA 1 close to the personal computer 2, without the need for the PDA 1 to make a "query", which is normally performed in Bluetooth, or without the need to select the personal computer 2 as a communicating device.

However, even though the communicating device is specified, it does not mean that the Bluetooth communication function of the communicating device is running. Accordingly, by sending specific command data for starting the Bluetooth function of the communicating device, Bluetooth communication can be easily established.

The definition of the specific command data to be used in the present invention is described below. FIGS. 4A and 4B illustrate an example of the structure of a data packet to be sent and received when Felica is used as an interface.

As shown in FIG. 4A, a 6-byte preamble is disposed at the head of the packet, and then, a 2-byte sync code is disposed. After the 2-byte sync code, packet data is disposed. At the head of the packet data, the length (LEN) indicating the number of bytes of the packet data is defined. After the packet data, 2-byte parity (CRC: Cyclic Redundancy Check), which is an error correcting code, for detecting errors, is added.

As shown in FIG. 4B, a predetermined value representing the type of packet data is set in the head PD0 of the packet data. In the present invention, a hexadecimal value "FF", for example, is set in PD0, to indicate that the subsequent packet structure is a system dependent command.

When a value "FF" is set in PD0, a system code, which specifies the system, is set in PD1 and PD2, a device ID (IDm) is set in PD3 through PD10, a transaction label (tlabel) is set in PD11 so that asynchronous communication is possible, a command code representing the type of command data is set in PD12, a response code is set in PD12, and command data is disposed (stored) in PD14 through PDn.

The command definition is described in greater detail below. In order to provide the extendability and the general versatility for the command data, the command data is described in XML (extensible Markup Language) format. In the present invention, the value, for example, "00", is set in the command code to indicate that the command data is described in XML format. Similarly, the hexadecimal value "00" is also set in the response code. Accordingly, response data in response to command data in which "00" is set both in command-code and response code is described in XML format.

In response code, the response status in response to command data is set. For example, when command data is correctly sent and received, hexadecimal "00" is set in the response code. When command data is unknown, hexadecimal "80" is set. When command data cannot be executed, hexadecimal "81" is set. If there is no response after a lapse of a predetermined time, it is determined by the sender of command data that transmission has failed.

A single device may sometimes communicate with a plurality of devices. To deal with this situation, the value (for example, AA) for uniquely identifying a specific device is set in the transaction label, and then, command data A is sent. From response data returned from a plurality of devices, the response data in response to command data A can be specified by referring to the value (that is, AA) set in the transaction label.

The values set in the individual codes are examples only, and they may be changed as desired.

FIGS. 5A and 5B illustrate examples of command data and response data, respectively, described in XML format. FIG. 5A illustrates command data, and FIG. 5B illustrates response data in response to the command data.

As shown in FIG. 5A, command data for switching ON or OFF the communication interface of a communicating device is indicated in the area between <setInterfaceState> and </setInterfaceState>. The interface name is specified in the area between <InterfaceName> and </InterfaceName>. The state (on/off) of the interface is specified in the area between <InterfaceState> and </InterfaceState>. In this example, "bluetooth" is indicated as the element of <InterfaceName>, and "on" is indicated as the element of <InterfaceState>. This means that the command data is for switching ON (starting) the Bluetooth communication function.

Then, from the communicating device that has received the command data shown in FIG. 5A, response data indicating <setInterfaceStateResponse/> is returned, as shown in FIG. 5B.

A description is given below, with reference to the flowchart of FIG. 6, of the processing when the PDA 1 starts the Bluetooth communication function of the personal computer 2 by using the command data shown in FIG. 5A.

In step S41, the user operates the operation input unit 36 to give an instruction to write information concerning the Bluetooth device. Then, the CPU 31 of the personal computer 2 obtains the Bluetooth information from the storage unit 38, and supplies it to the reader/writer 39 and allows the reader/writer 39 to write the information into the IC card 40. In step S21, the reader/writer 39 adds the Bluetooth information supplied from the CPU 31 to the IC card 40.

In step S1, in response to the operation on the operation input unit 16 by the user, the CPU 11 of the PDA 1 detects the reader/writer 39 of the personal computer 2, and determines whether an instruction has been given to start the radiation of an electromagnetic wave for requesting the CPU 11 to start the Bluetooth function of the personal computer 2. The CPU 11 repeats this processing until the instruction is given.

In step S1, when an instruction has been given to radiate an electromagnetic wave, the process proceeds to step S2. In step S2, the CPU 11 controls the reader/writer 19 to start the radiation of an electromagnetic wave (start polling). An electromagnetic wave may always be radiated rather than being radiated upon receiving an instruction from the user.

In step S3, the CPU 11 determines based on the output of the reader/writer 19 whether a device provided with a reader/writer and a non-contact IC card has been detected. The CPU 11 repeats this processing until it detects such a device. For example, when the PDA 1 is located in proximity with the personal computer 2, and when the reader/writer 39 of the personal computer 2 receives the electromagnetic wave, information indicating the reception of the electromagnetic wave is sent. Then, the CPU 11 determines whether the device has been detected based on this response.

If it is determined in step S3 that a device having a reader/writer has been detected, the process proceeds to step S4. In step S4, the CPU 11 requests the reader/writer 39 of the personal computer 2 to send the Bluetooth information.

In step S22, the reader/writer 39 of the personal computer 2 receives a transmission request from the PDA 1. In step S23, the reader/writer 39 reads the Bluetooth information recorded on the IC card 40 and sends it to the PDA 1.

In step S5, the CPU 11 of the PDA 1 receives the Bluetooth information of the personal computer 2 based on the output of the reader/writer 19, and identifies the device to be used in Bluetooth communication. In step S6, the CPU 11 sends command data concerning the start of the Bluetooth function, such as that shown in FIG. 5A, to the personal computer 2 via the reader/writer 19.

In step S24, the reader/writer 39 of the personal computer 2 receives the command data sent from the PDA 1. In step S25, the reader/writer 39 requests the CPU 31 to start the Bluetooth function. In step S42, the CPU 31 of the personal computer 2 receives the output (request) of the reader/writer 39. In step S43, the CPU 31 starts the Bluetooth communication function (wireless communication unit 41).

In step S26, the reader/writer 39 of the personal computer 2 sends response data, such as that shown in FIG. 5B, to the PDA 1. In step S7, upon receiving this response data, the CPU 11 of the PDA 1 starts the Bluetooth communication function (wireless communication unit 21) of the PDA 1.

In step S8, the CPU 11 of the PDA 1 searches for services connectable with the personal computer 2, and if there are a plurality of services connectable with the personal computer 2, the CPU 11 selects the service that the PDA 1 wishes to connect (use).

In steps S9 and S44, processing for establishing Bluetooth communication is performed between the PDA 1 and the personal computer 2.

As discussed above, even if the Bluetooth communication function of the communicating device, i.e., the personal computer 2, is not running, the PDA 1 can easily start the Bluetooth communication function of the personal computer 2 by sending command data to start the function.

In this example, the Bluetooth communication function of a communicating device is started by sending command data. Other predetermined functions of the communicating device can also be controlled by sending various command data.

Figure 6:
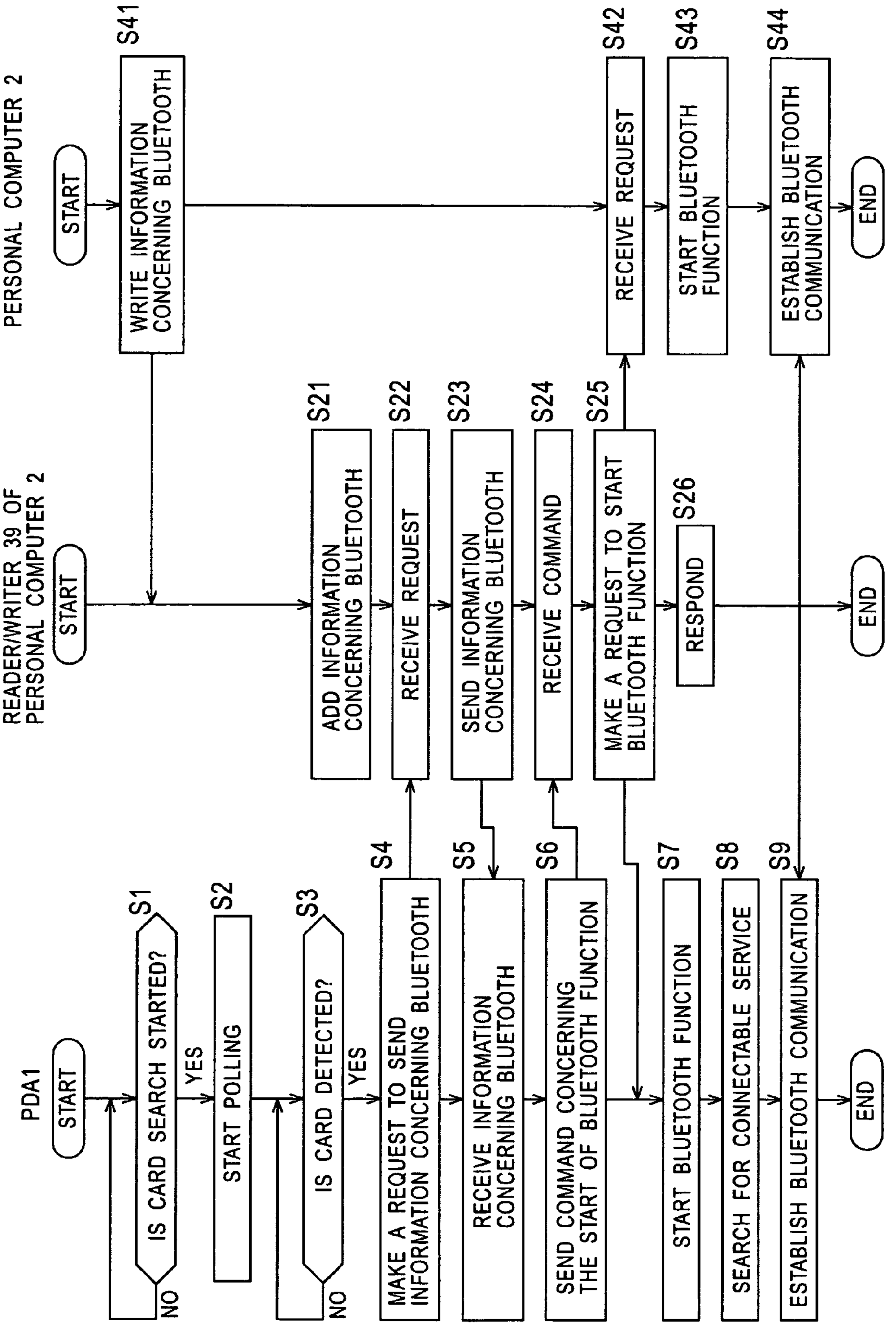
FIG. 6 is a flowchart illustrating processing when a PDA starts a Bluetooth communication function of a personal computer.
Figure 7:
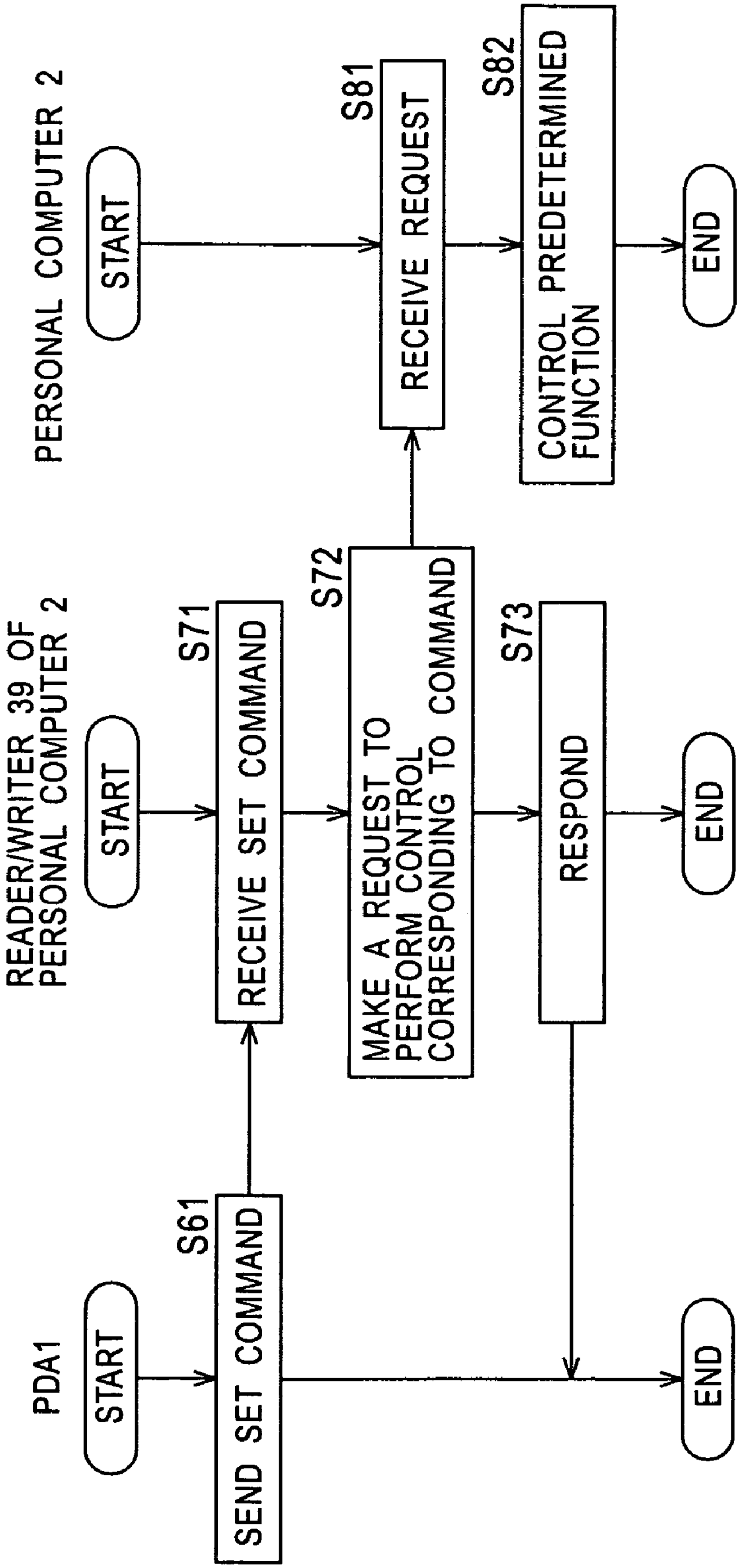
FIG. 7 is a flowchart illustrating processing when a PDA controls a predetermined function of a personal computer.

A description is now given as another example of the processing of steps S6, S24 through S26, S42, and S43 shown in FIG. 6, with reference to the flowchart of FIG. 7, of processing by the PDA 1 for controlling a predetermined function of the personal computer 2.

In step S61, the CPU 11 of the PDA 1 sends set command data for controlling a predetermined function to the personal computer 2 via the reader/writer 19.

Examples of the set command data for controlling a predetermined function are described below with reference to FIGS. 8A, 8B, 9A, and 9B.

In the example shown in FIG. 8A, in the area between <setpowerState> and </setpowerState>, command data for switching ON or OFF the power of a communicating device is indicated. In the area between <powerState> and </powerState>, the state of the power (on/off) is indicated. In this example, "on" is indicated as the element of <powerState>, which means that the command data is for switching ON the power state (power).

In the example shown in FIG. 9A, in the area between <setServiceState> and </setServiceState>, command data for starting or stopping the service designated by the communicating device is indicated. In the area between <ServiceName> and </ServiceName>, the service name is designated. In the area between <ServiceState> and </ServiceState>, the state (on/off) of the service is specified. In this example, "infra" is indicated as the element of <ServiceName>, and "on" is indicated as the element of <ServiceState>. This means that the command data is for starting the service of an infrastructure mode (network connection).

Referring back to FIG. 7, in step S71, the reader/writer 39 of the personal computer 2 receives the set command data (FIG. 8A or 9B) sent from the PDA 1. In step S72, the reader/writer 39 requests the CPU 31 to control the predetermined function. In step S81, the CPU 31 of the personal computer 2 receives the output (request) of the reader/writer 39, and in step S82, the CPU 31 controls the predetermined function.

Accordingly, for example, when the set command data shown in FIG. 8A is received, the power of the personal computer 2 is turned on. When the set command data shown in FIG. 9A is received, the service of the infrastructure mode of the personal computer 2 is started.

In step S73, the reader/writer 39 of the personal computer 2 sends response data in response to the set command data received in the processing of step S71 to the PDA 1.

Accordingly, in response to the set command data shown in FIG. 8A, response data indicated as <setpowerStateResponse/> is returned, as shown in FIG. 8B. In response to the set command data shown in FIG. 9A, response data indicated as <setServiceStateResponse/> is returned, as shown in FIG. 9B.

According to the above-described processing, the PDA 1 is able to easily control the ON/OFF of the power of the personal computer 2 or the start/stop of the service, designated by the personal computer 2 by sending various commands to the communicating device, i.e., the personal computer 2.

If "adhoc" is indicated as the element of <ServiceName> in the set command data shown in FIG. 9A, the service of an ad hoc mode (connection between devices) is designated. The service indicated as the element of <ServiceName> is not restricted to services unique to Bluetooth, and general-purpose file transfer services and individual applications can be designated.

For example, when a predetermined image file is transferred from the PDA 1 to the personal computer 2, a general-purpose file transfer service is indicated as the element of <ServiceName> in the set command data shown in FIG. 9A, and "on" is indicated as the element of <ServiceState>. Also, an image editing application is indicated as the element of another <ServiceName>, and "on" is indicated as the element of another <ServiceState>. Accordingly, a series of processing, such as transferring the predetermined image file from the PDA 1 to the personal computer 2 and opening the image file by the designated image editing application, can be performed with a simple operation.

It is also possible, not only to control predetermined functions of a communicating device, but also to obtain, for example, the state of a predetermined function of a communicating device.

A description is given below, as another example of the processing of steps S6, S24 through S26, S42, and S43 of FIG. 6, with reference to the flowchart of FIG. 10, of processing by the PDA 1 for obtaining the state of a predetermined function of a communicating device, i.e., the personal computer 2.

In step S101, the CPU 11 of the PDA 1 sends get command data for obtaining the state of a predetermined function to the personal computer 2 via the reader/writer 19.

Examples of the get command data for obtaining the state of a predetermined function are discussed below with reference to FIGS. 11A through 13B.

In the example shown in FIG. 11A, in the area between <getInterfaceState> and </getInterfaceState>, command data for obtaining the state of the communication interface of the communicating device is indicated. In the area between <InterfaceName> and </InterfaceName>, the interface name is designated. In this example, "bluetooth" is indicated as the element of <InterfaceName>, which means that the command data is for obtaining the state of a Bluetooth communication function.

In the example shown in FIG. 12A, </getpowerState> is indicated, which means that the command data is for obtaining the state of the power of a communicating device.

In the example shown in FIG. 13A, in the area between <getServiceState> and </getServiceState>, command data for obtaining the state of the service designated by a communicating device is indicated. In the area between <ServiceName> and </ServiceName>, the service name is designated. In this example, "infra" is indicated as the element of <ServiceName>, which means that the command data is for obtaining the state of the service of the infrastructure mode.

Referring back to FIG. 10, in step S111, the reader/writer 39 of the personal computer 2 receives the get command data (FIG. 11A, 12A, or 13A) sent from the PDA 1. In step S112, the reader/writer 39 requests the CPU 31 to send information concerning the state of the predetermined function. In step S121, the CPU 31 of the personal computer 2 receives the output (request) of the reader/writer 39. In step S122, the CPU 31 obtains the information concerning the state of the predetermined function, and supplies it to the reader/writer 39.

In step S113, the reader/writer 39 sends response data corresponding to the command data received in the processing of step S111 based on the information concerning the state of the predetermined function supplied from the CPU 39.

Accordingly, for example, response data, such as that shown in FIG. 11B, is returned in response to the get command data shown in FIG. 11A. Response data, such as that shown in FIG. 12B, is returned in response to the get command data shown in FIG. 12A. Response data, such as that shown in FIG. 13B, is returned in response to the get command data shown in FIG. 13A.

More specifically, in the example shown in FIG. 11B, "bluetooth" is indicated as the element of <InterfaceName>, and "on" is indicated as the element of <InterfaceState>. This means that the current state of the Bluetooth communicating function is ON. In the example shown in FIG. 12B, "on" is indicated as the element of <powerState>, which means that the current state of the power is ON. In the example shown in FIG. 13B, "on" is indicated as the element of <ServiceState>, which means that the current state of the service of the infrastructure mode is ON.

According to the above-described processing, the PDA 1 is able to easily obtain information concerning the state of the communication interface of the personal computer 2, the state of the power, or the state of the service designated by the personal computer 2 by sending various commands to a communicating device, i.e., the personal computer 2.

More specifically, by performing non-contact communication between the PDA 1 and the personal computer 2, various items of information recorded in the IC card 20 and the IC card 40 can be read, or various commands can be sent to the communicating devices. The present invention is not restricted to this configuration. Various items of information and various commands may be stored in a memory card, and the memory card is directly handed to a communicating device, and upon receiving the memory card, the device is able to read various items of information and various commands from the memory card. An example of the configuration and an example of the operation of this modification are discussed below.

Figure 14:
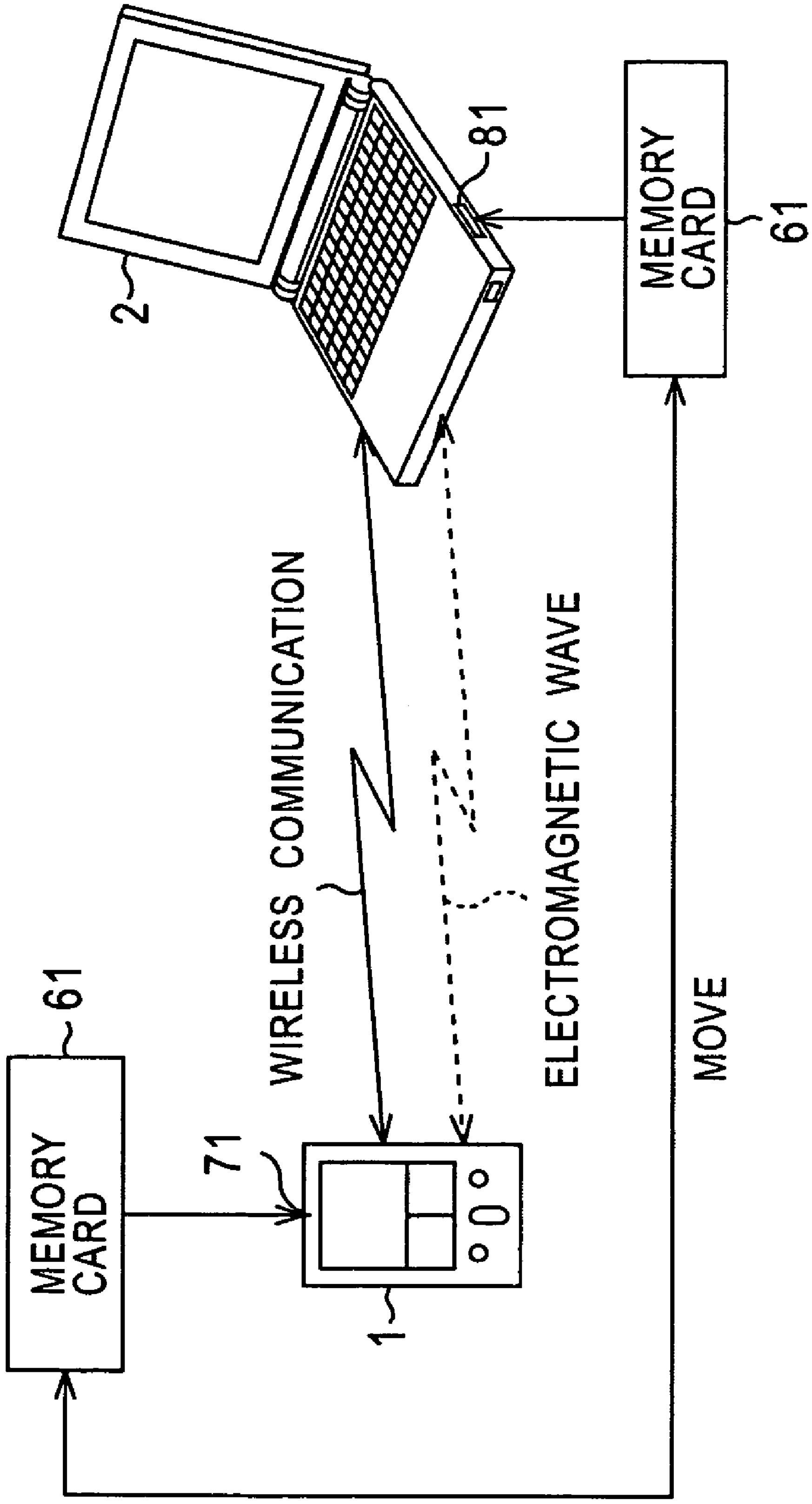
FIG. 14 illustrates the concept when a PDA and a personal computer send and receive various items of information and various commands via a memory card.

FIG. 14 illustrates the concept of the sending and receiving of various items of information and various commands between the PDA 1 and the personal computer 2 via a memory card 61. Elements equivalent to those in FIG. 1 are designated with like reference numerals, and an explanation thereof is thus omitted.

The PDA 1 is able to read or write various items of information from or into the memory card 61 fixed in a slot 71. Similarly, the personal computer 2 is able to read or write various items of information from or into the memory card 61 fixed in a slot 81.

For example, the CPU 31 (FIG. 3) of the personal computer 2 reads information concerning the Bluetooth device of the personal computer 2 from the storage unit 38 or the IC card 40, and supplies the information to the memory card 61 via the input/output interface 35 and the slot 81 and stores it therein. Then, the memory card 61 in which the information concerning the Bluetooth device is stored is inserted into the slot 71 of the PDA 1. The CPU 11 of the PDA 1 reads the information concerning the Bluetooth information stored in the memory card 61 fixed in the slot 71 so as to identify the device to be used in Bluetooth communication.

Also, for example, the CPU 11 (FIG. 2) of the PDA 1 generates a control command for the personal computer 2, and supplies it to the memory card 61 via the bus 14, the input/output interface 15, and the slot 71 and stores it therein. Then, the memory card 61 in which the control command is stored is inserted into the slot 81 of the personal computer 2. The CPU 31 of the personal computer 2 reads the control command stored in the memory card 61 fixed in the slot 81 so as to control the predetermined function.

The memory card 61 shown in FIG. 14 is one type of flash memory card, which is referred to as "MEMORY STICK"

(trade name), developed by the present applicant. In this memory card 61, a flash memory device, which is one type of a non-volatile memory, i.e., an EEPROM (Electrically Erasable and Programmable Read Only Memory), is stored in a 21.5×50×2.8 [mm] small, thin plastic casing. Images, sound, music, or various data can be read and written from and into the memory card 61 via 10 pin terminals.

The memory card 61 also employs a unique serial protocol that can ensure the compatibility between communicating devices in response to a change in the specifications of a built-in flash memory due to an increase in the capacity. With this protocol, high speeds, such as the maximum writing speed of 1.5 [MB/S] and the maximum reading speed of 2.45 [MB/S], can be implemented, and high reliability can be ensured by providing an accidental-erasing preventing switch.

Accordingly, since the PDA 1 and the personal computer 2 are configured such that the memory card 61 can be attached thereto, data sharing with other devices can be implemented via the memory card 61.

A description is given below, with reference to the flowchart of FIG. 15, of processing for starting a Bluetooth communication function by storing the command data shown in FIG. 5A in the memory card 61 by the PDA 1, by loading the memory card 61 in the personal computer 2, and by reading the command data from the memory card 61 by the personal computer 2.

In step S151, the CPU 31 of the personal computer 2 reads information concerning the Bluetooth device of the personal computer 2 from the storage unit 38 or the IC card 40, and supplies the information to the memory card 61 via the input/output interface 35 and the slot 81, and stores it therein. In step S152, the user of the personal computer 2 moves the memory card 61 in which the information concerning the Bluetooth device is stored to the PDA 1.

In step S141, the user of the PDA 1 obtains the memory card 61 moved from the personal computer 2, and inserts the memory card 61 into the slot 71. In step S142, the CPU 11 of the PDA 1 reads the information concerning the Bluetooth device stored in the memory card 61 fixed in the slot 71 via the input/output interface 15 and the bus 14 so as to identify the device used in Bluetooth communication.

In step S143, the CPU 11 supplies command data concerning the start of the Bluetooth function, such as that shown in FIG. 5A, to the memory card 61 via the bus 14, the input/output interface 15, and the slot 71, and stores the command data therein. In step S144, the user of the PDA 1 moves the memory card 61 in which the command data concerning the start of the Bluetooth function is stored to the personal computer 2.

In step S153, the user of the personal computer 2 obtains the memory card 61 moved from the PDA 1, and inserts it into the slot 81. In step S154, the CPU 31 of the personal computer 2 reads the command data concerning the start of the Bluetooth function stored in the memory card 61 fixed in the slot 81, and starts the Bluetooth communication function (wireless communication unit 41).

When starting the Bluetooth communication function, a message, for example, "Bluetooth communication function has started" may be displayed on the LCD via the display controller 37.

Processings in steps S145 through S147, and S155 are similar to those of steps S7 through S9, and S44, respectively, of FIG. 6, and an explanation thereof is thus omitted.

Figure 15:
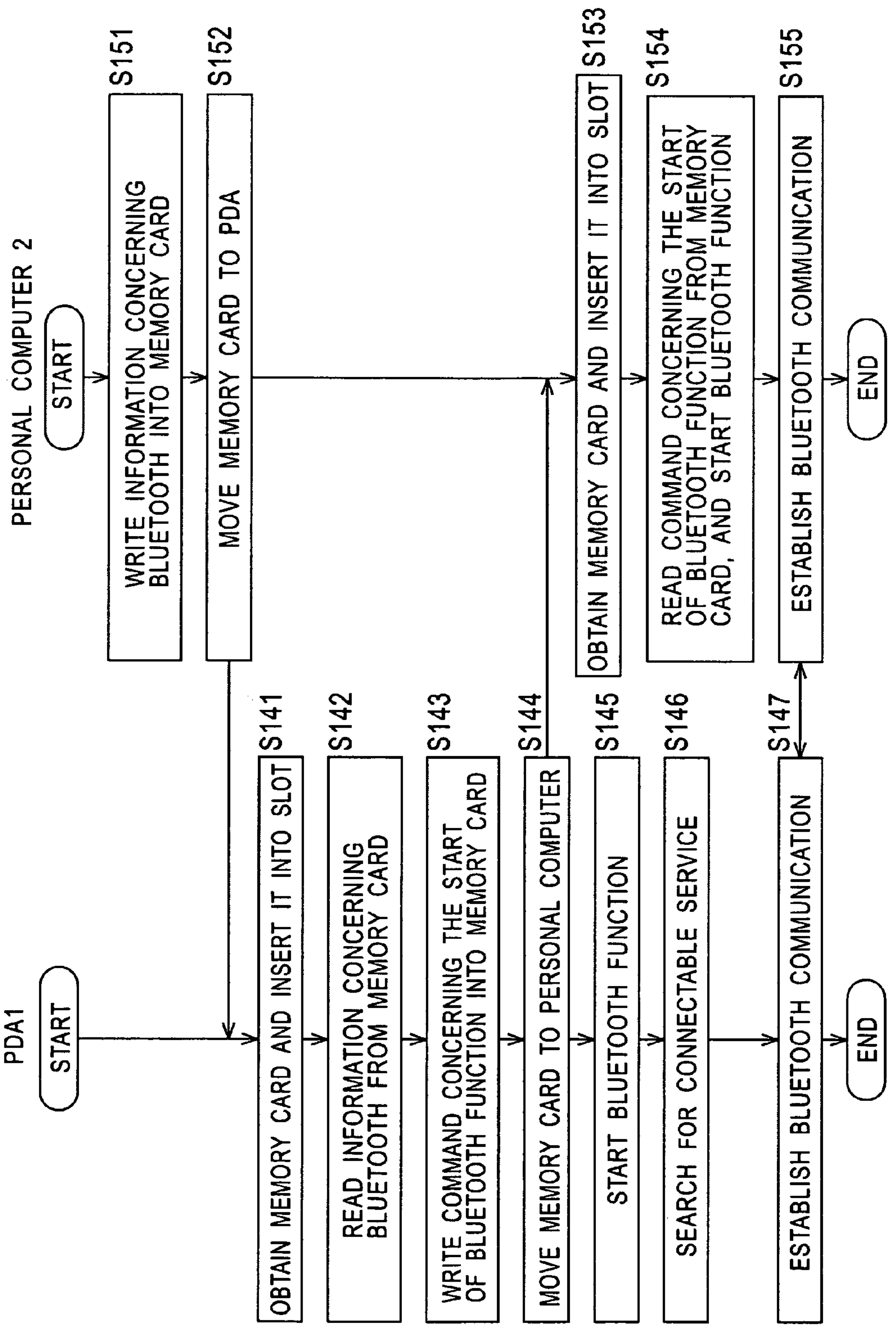
FIG. 15 is a flowchart illustrating processing when a PDA starts a Bluetooth communication function of a personal computer.

As described above, not only by performing non-contact processing between the reader/writer 19 and the reader/writer 39 shown in FIG. 6, but also by using the memory card 61, as discussed in the processing shown in FIG. 15, the PDA 1 is able to easily start the Bluetooth communication function of the personal computer 2.

A description is given below as another example of the processing of steps S143, S144, S153, and S154 of FIG. 15, with reference to the flowchart of FIG. 16, of processing by the PDA 1 for controlling a predetermined function of the personal computer 2 by using the memory card 61.

In step S171, the CPU 11 of the PDA 1 supplies set command data for controlling a predetermined function, such as the command data for switching ON or OFF the power, shown in FIG. 8A, or the command data for starting or stopping the service, shown in FIG. 9A, to the memory card 61 via the bus 14, the input/output interface 15, and the slot 71, and stores the set command data therein. In step S172, the user of the PDA 1 moves the memory card 61 in which the set command data (FIG. 8A or 9A) is stored to the personal computer 2.

In step S181, the user of the personal computer 2 obtains the memory card 61 moved from the PDA 1, and inserts it into the slot 81. In step S182, the CPU 31 of the personal computer 2 reads the set command data stored in the memory card 61 fixed in the slot 81, and controls the predetermined function (for example, switching ON the power or starting the service of the infrastructure mode).

When controlling the predetermined function, a message, such as "Power is switched ON" or "Service of infrastructure mode has started", may be displayed on the LCD via the display controller 37.

Figure 16:
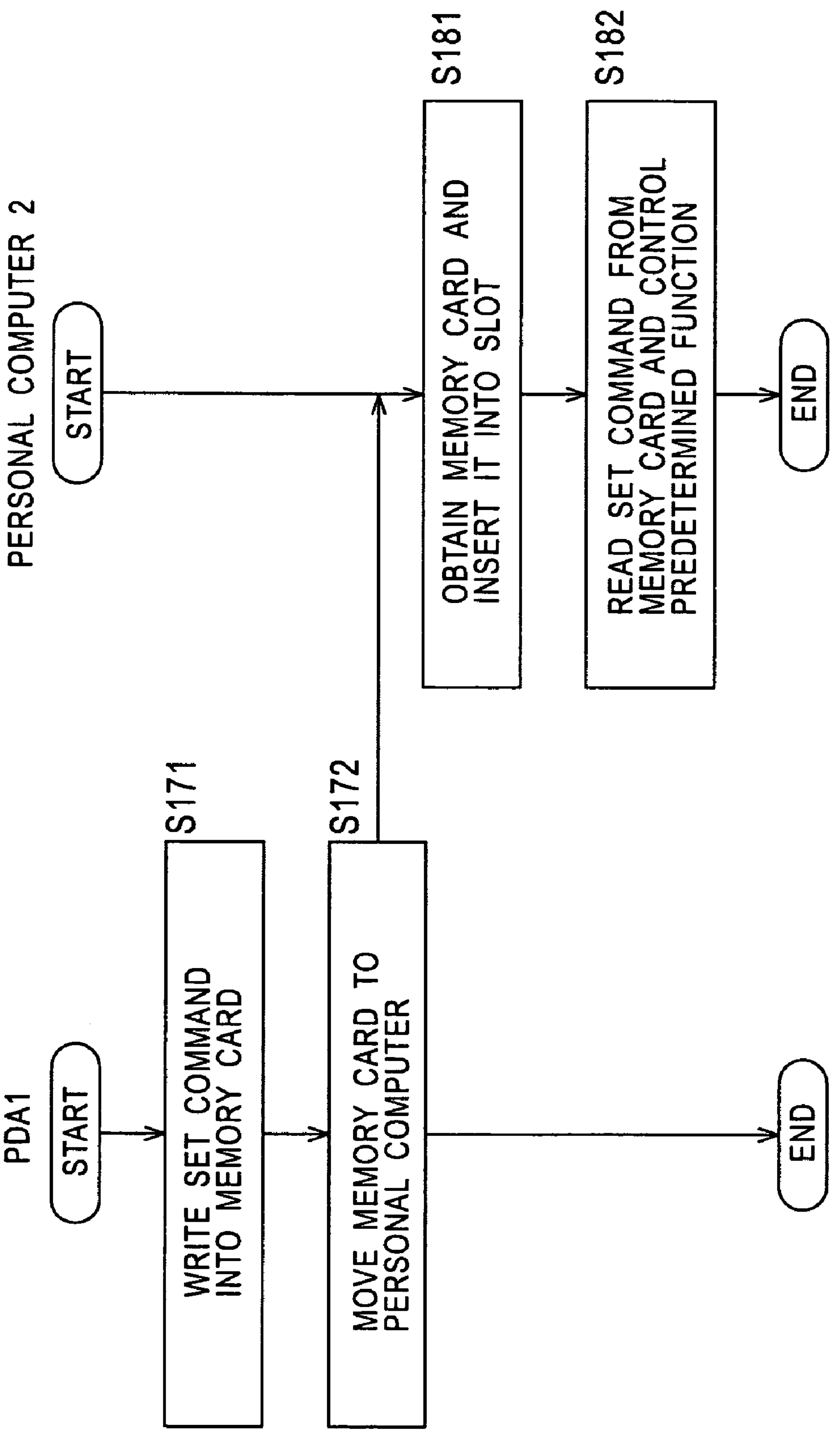
FIG. 16 is a flowchart illustrating processing by a PDA for controlling a predetermined function of a personal computer.

As described above, not only by performing non-contact processing between the reader/writer 19 and the reader/writer 39, but also by using the memory card 61 as discussed in the processing shown in FIG. 16, the PDA 1 is able to easily control a predetermined function of the personal computer 2.

Figure 17:
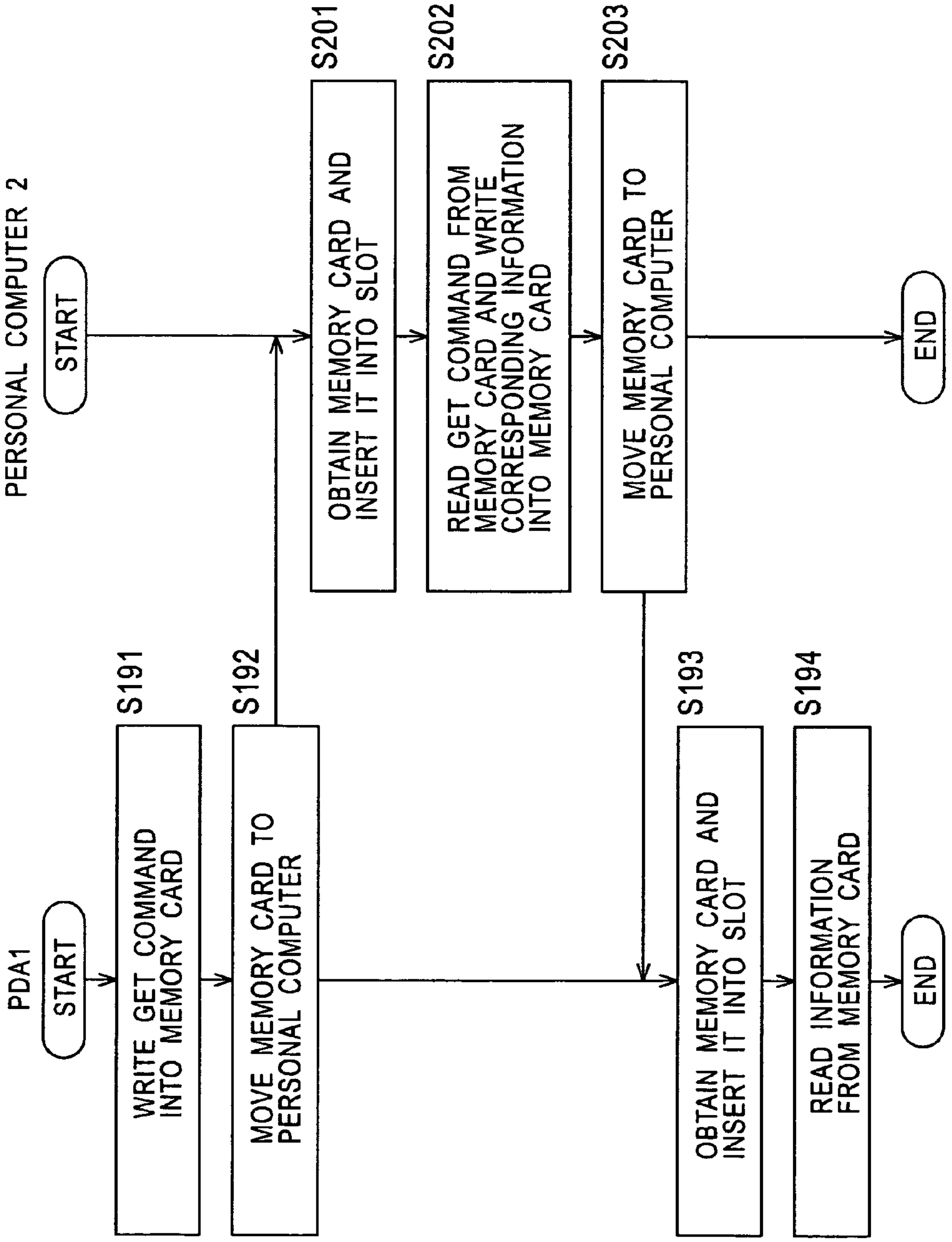
FIG. 17 is a flowchart illustrating by a PDA for obtaining the state of a predetermined function of a personal computer.

A description is now given as another example of the processing of steps S143, S144, S153, and S154, with reference to the flowchart of FIG. 17, of processing by the PDA 1 for obtaining the state of a predetermined function of the personal computer 2 by using the memory card 61.

In step S191, the CPU 11 of the PDA 1 supplies get command data for obtaining the state of a predetermined function, for example, the command data for obtaining the state of the communicating interface, shown in FIG. 11A, the command data for obtaining the state of the power, shown in FIG. 12A, or the command data for obtaining the state of the service, shown in FIG. 13A, to the memory card 61 via the bus 14, the input/output interface 15, and the slot 71, and stores the command data therein. In step S192, the user of the PDA 1 moves the memory card 61 in which the get command data (FIG. 11A, 12A, or 13A) is stored to the personal computer 2.

In step S201, the user of the personal computer 2 obtains the memory card 61 moved from the PDA 1, and inserts it into the slot 81. In step S202, the CPU 31 of the personal computer 2 reads the get command data stored in the memory card 61 fixed in the slot 81, and stores the corresponding information (information concerning the state of the predetermined function) in the memory card 61. In step S203, the user of the personal computer 2 moves the memory card 61 in which response data (FIG. 11B, 12B, or 13B) is stored to the personal computer 2.

In step S193, the user of the PDA 1 obtains the memory card 61 moved from the personal computer 2, and inserts it into the slot 71. In step S194, the CPU 11 of the PDA 1 reads the response data stored in the memory card 61 fixed in the slot 71 so as to obtain the information concerning the state of the predetermined function of the personal computer 2.

When the information concerning the state of a predetermined function is obtained, a message, such as "The current state of Bluetooth communication function is ON", "The current state of power is ON", or "The current state of infrastructure mode is ON", may be displayed on the LCD via the display controller 17.

Figure 10:
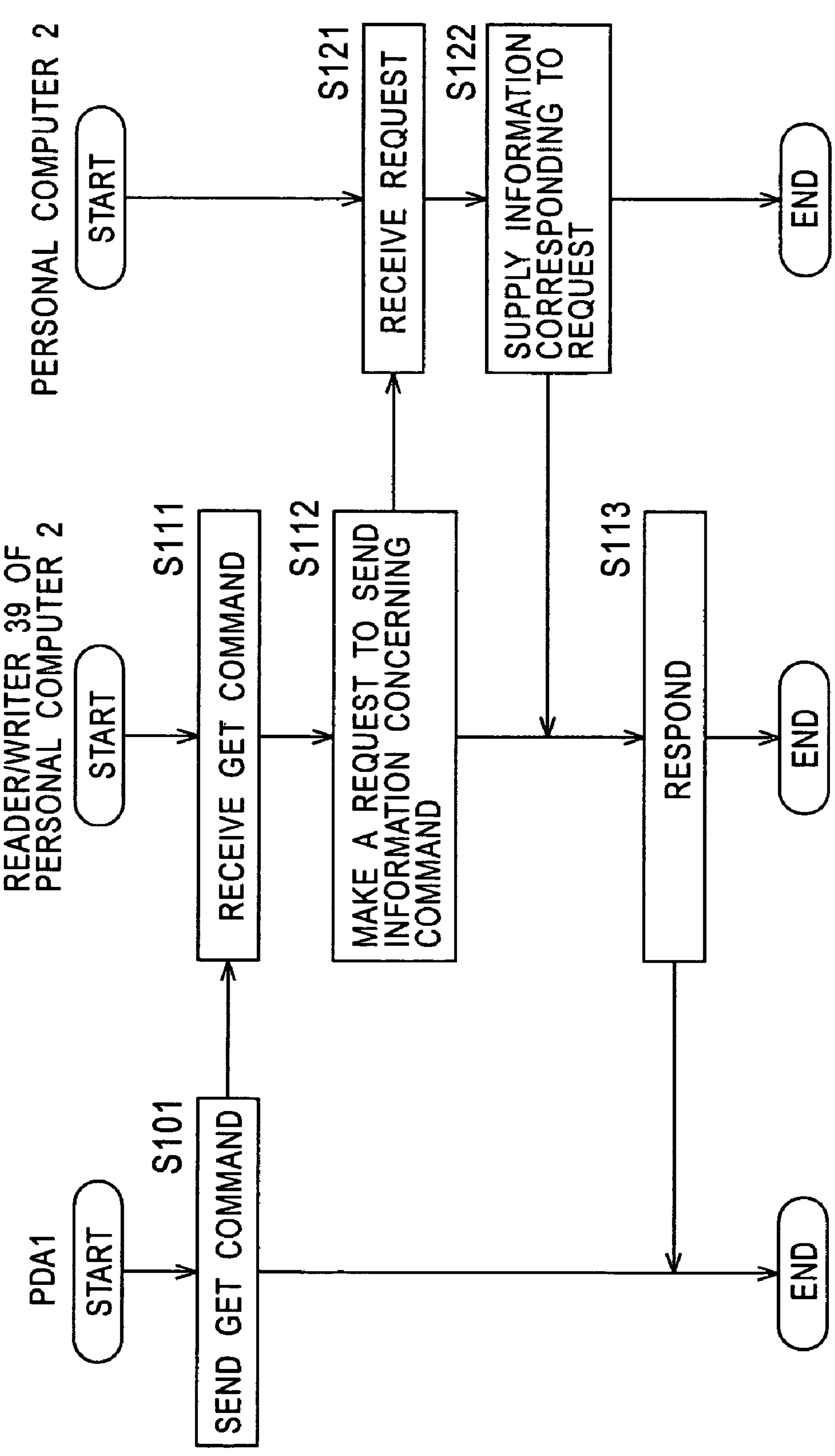
FIG. 10 is a flowchart illustrating processing by a PDA for obtaining the state of a predetermined function of the personal computer.

As described above, not only by performing non-contact processing between the reader/writer 19 and the reader/writer 39 shown in FIG. 10, but also by using the memory card 61 as discussed in the processing shown in FIG. 17, the PDA 1 is able to easily obtain information concerning the state of a predetermined function of the personal computer 2.

As discussed above, even if the PDA 1 is not provided with the reader/writer 19 and the IC card 20, and even if the personal computer 2 is not provided with the reader/writer 39 and the IC card 40, the PDA 1 and the personal computer 2 can easily send and receive various items of information and command data by using the memory card 61.

The memory card 61 is an example only, and other storage media that allow data sharing with other electronic devices can be widely used.

Additionally, the invention is not restricted to storage media, such as the IC cards 20 and 40 and the memory card 61. For example, infrared communication may be employed to perform data sharing with other electronic devices.

Instead of performing the above-described Bluetooth wireless communication, other wireless communication standards, for example, IEEE802.11a and IEEE802.11b, may be applied. IEEE802.11 is wireless LAN standard formats defined in July 1998 by the 802 committee, which establishes the LAN technology in IEEE (Institute of Electrical and Electronic Engineers), and includes IEEE802.11b, which implements the transmission rate of 11 Mbps in a 2.4 GHz band, and IEEE802.11a, which uses a 5.2 GHz band.

Figure 18:
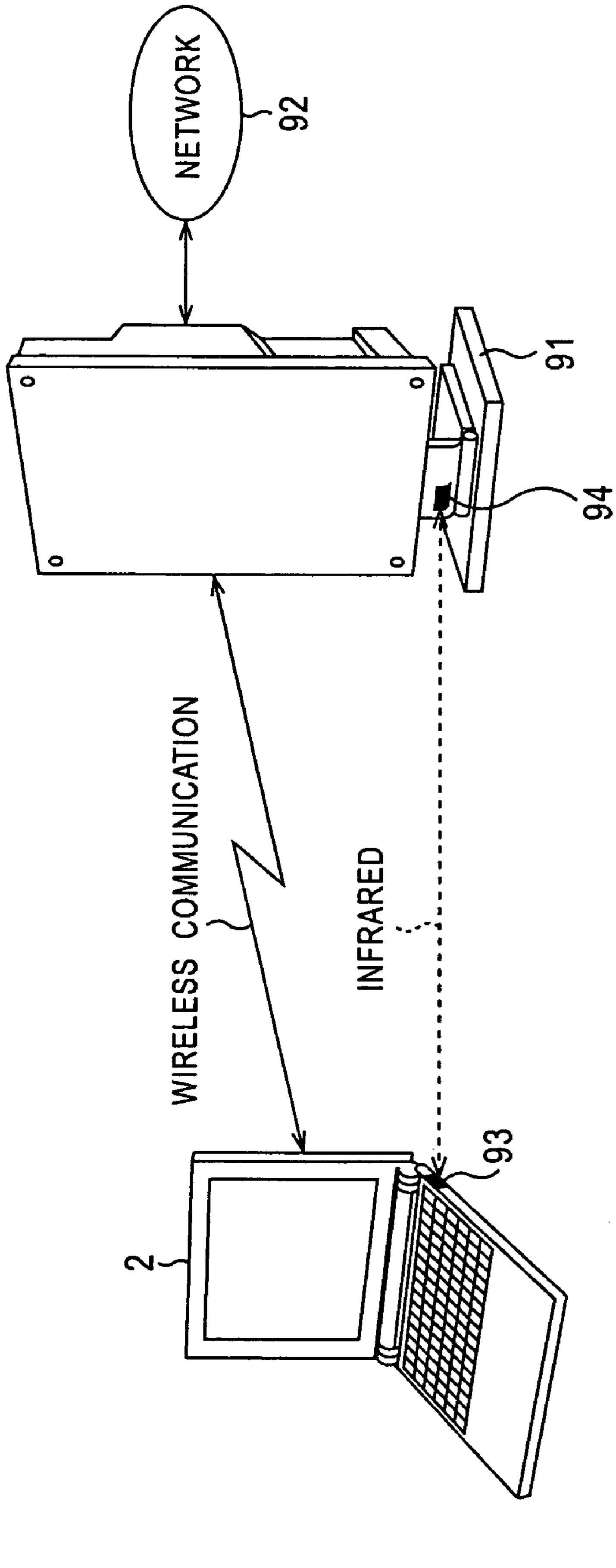
FIG. 18 is a schematic diagram illustrating the concept when a personal computer obtains information concerning wireless communication from an access point by using infrared communication.

FIG. 18 illustrates the concept of the sharing of information which is set by wireless communication of another standard by using infrared wireless communication (hereinafter referred to as "infrared communication").

The personal computer 2 is provided with a wireless communication function using IEEE802.11b, and performs wireless communication with an access point 91, which is also provided with a wireless communication function using IEEE802.11b, by radio waves, thereby connecting to a network 92 to which the access point 91 is connected.

The personal computer 2 also has an infrared communication port 93, and performs infrared communication using a communication standard, typically, IrDA (Infrared Data Association), by being located in proximity with the access point 94, which is also provided with an infrared communication port 94. Thus, the personal computer 2 is able to share various items of information with the access point 91.

IrDA is a short-distance infrared data communication standard, and in version 1.0, for example, the communication distance is 1 m, and the maximum communication speed is 115.2 kbps.

The infrared communication ports 93 and 94 are able to perform infrared communication by the same communication standards. Then, the personal computer 2 and the access point 91 perform infrared communication by being located within the area in which such infrared communication is possible.

In IEEE802.11b wireless communication, in order to identify a network formed by communication, communicating parties, i.e., the personal computer 2 and the access point 91, must share a network ID, which is referred to as SSID (Service Set IDentification), in advance.

Moreover, in terms of security, it is desirable that information be encrypted. In IEEE802.11b wireless communication, packets to be transmitted can be encrypted by using WEP (Wired Equivalent Privacy).

WEP is a wireless-communication encryption technique, which is used for encrypting and decrypting data by two communicating parties by using a common 40-bit or 128-bit private key.

The access point 91 possesses preset SSID and WEP private key, and the personal computer 2 obtains the SSID and the WEP private key required for the connection in IEEE802.11b wireless communication by performing infrared communication with the access point 91.

Figure 19:
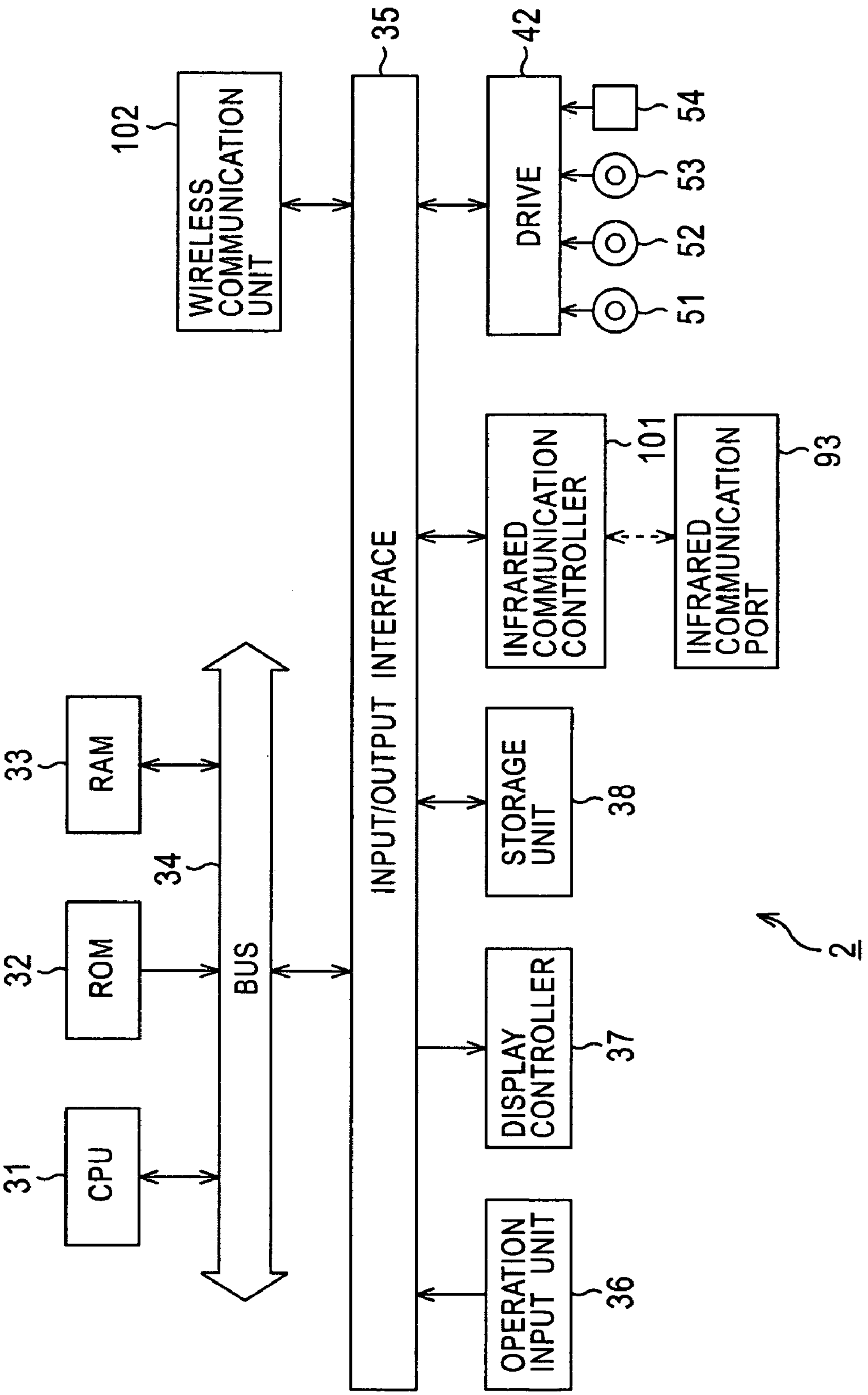
FIG. 19 is a block diagram illustrating an example of the internal configuration of the personal computer shown in FIG. 18.

FIG. 19 illustrates an example of the internal configuration of the personal computer 2 shown in FIG. 18. Elements equivalent to those in FIG. 3 are indicated by like reference numerals, and an explanation thereof is thus omitted.

An infrared communication controller 101 is connected to the input/output interface 35 of the personal computer 2, and controls the infrared communication port 93 so as to perform infrared communication with the access point 91 by using IrDA.

A wireless communication unit 21 for performing communication with the access point 91 by using an IEEE802.11b wireless communication function is also connected to the input/output interface 35.

The infrared communication controller 119 performs various types of processing based on a control signal supplied from a CPU 111 or response data sent from the infrared communication port 94.

For example, the CPU 31 generates a control command to be sent to the access point 91, and outputs it to the infrared communication controller 101 via the bus 34 and the input/output interface 35. The infrared communication controller 101 transmits a modulation wave in accordance with the command from the infrared communication port 93 as an infrared signal so as to send various items of data to the access point 91 located in proximity with the personal computer 2.

The infrared communication controller 101 also obtains data by demodulating an infrared signal supplied from the access point 91 via the infrared communication port 93, and supplies the data to the CPU 31 via the input/output interface 35 and the bus 34.

Figure 20:
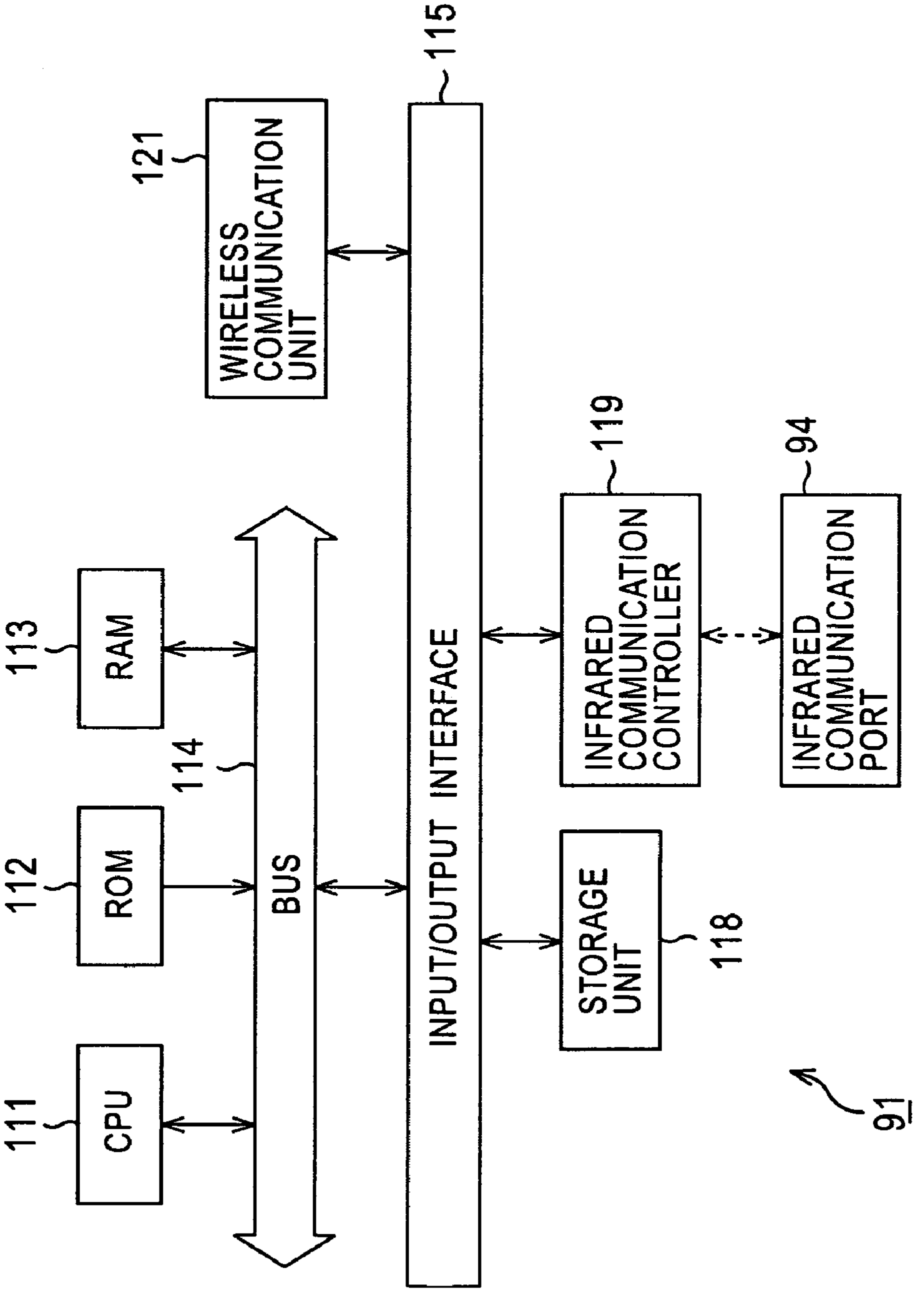
FIG. 20 illustrates an example of the internal configuration of the access point shown in FIG. 18.

FIG. 20 illustrates an example of the internal configuration of the access point 91 shown in FIG. 18.

A CPU 111 executes various types of processing according to programs stored in a ROM 112 or a storage unit 118. Programs executed by the CPU 111 and data are stored in a RAM 113. The CPU 111, the ROM 112, and the RAM 113 are connected to each other via a bus 114.

An input/output interface 115 is connected to the bus 114. A storage unit 118, formed of a RAM or a flash memory, for storing programs and various items of data, an infrared communication controller 119 for controlling the infrared communication port 94 so as to perform infrared communication with the personal computer 2, and a wireless communication unit 121 for communicating with the personal computer 2 by using an IEEE802.11b wireless communication function are connected to the input/output interface 115.

The infrared communication controller 119 performs various types of processing based on a control signal supplied from the CPU 111 or response data sent from the infrared communication port 94.

For example, the CPU 111 generates a control command to be sent to the personal computer 2, and outputs it to the infrared communication controller 119 via the bus 114 and the input/output interface 115. The infrared communication controller 119 transmits a modulation wave in accordance with the command from the infrared communication port 94 as an infrared signal, and sends various items of data to the personal computer 2 located in proximity with the access point 91.

The infrared communication controller 119 also obtains data by demodulating an infrared signal supplied from the personal computer 2 via the infrared communication port 94, and supplies the data to the CPU 111 via the input/output interface 115 and the bus 114.

In the storage unit 118, information concerning IEEE802.11b wireless communication (information concerning ssid and WEP private key) performed by the wireless communication unit 121 is recorded. Based on a request from the personal computer 2 supplied from the infrared communication controller 119, the CPU 11 supplies such information to the infrared communication unit 119. Under the control of the CPU 11, the infrared communication controller 119 supplies the information concerning IEEE802.11b wireless communication, which is supplied from the storage unit 118, to the personal computer 2 via the infrared communication port 94.

A description is given below, with reference to the flowchart of FIG. 21, of processing when the personal computer 2 connects to the access point 91 by IEEE802.11b wireless communication.

First, in step S221, based on an instruction from the user, the CPU 31 of the personal computer 2 requests the infrared communication controller 101 to start preparations for infrared communication. Based on this request, the infrared communication controller 101 controls the infrared communication port 93 to start preparations for infrared communication using IrDA, such as detecting the access point 91 located in proximity with the personal computer 2.

Similarly, in step S241, the CPU 111 of the access point 91 requests the infrared communication controller 119 to start preparations for infrared communication. Based on this request, the infrared communication controller 119 controls the infrared communication port 94 to start preparations for infrared communication using IrDA, such as detecting the personal computer 2 located in proximity with the access point 91.

Upon completing preparations, both the personal computer 2 and the access point 91 become ready to communicate with each other. In this case, in step S222, the infrared communication controller 101 of the personal computer 2 sends a connection request to the access point 91 located close to the personal computer 2 via the infrared communication port 93 by using IrDA infrared communication.

In step S242, the infrared communication controller 119 of the access point 91 receives the connection request via the infrared communication port 94. Then, in step S243, the infrared communication controller 119 of the access point 91 establishes infrared communication using IrDA, and sends a corresponding message to the personal computer 2 via the infrared communication port 94.

In step S223, the infrared communication controller 101 of the personal computer 2 obtains the message via the infrared communication port 93. Then, in step S224, the infrared communication controller 101 establishes infrared communication using IrDA.

Upon establishing infrared communication, in step S225, the CPU 31 of the personal computer 2 controls the infrared communication controller 101 to request the access point 91 to send wireless-communication connection information including information, such as ssid and the WEP private key, for connecting to the access point 91 by IEEE802.11b wireless communication.

Based on the request of the CPU 31, the infrared communication controller 101 requests the access point 91 to send the wireless-communication connection information via the infrared communication port 93.

In step S244, the infrared communication controller 119 of the access point 91 obtains the request via the infrared communication port 94, and then supplies the request to the CPU 111 via the input/output interface 115 and the bus 114.

Upon receiving the request of the personal computer 2 from the infrared communication controller 119, in step S245, the CPU 111 obtains the information, such as ssid and the WEP private key, stored in the storage unit 118, generates wireless-communication connection information, and supplies the information to the infrared communication controller 119.

FIG. 22 illustrates an example of data of the wireless-communication connection information.

In FIG. 22, in order to provide the extendability and the general versatility, the information, such as ssid and the WEP private key, for connecting to the access point 91 by IEEE802.11b wireless communication, is described in XML format.

In the area between tags <acessPoint> and </accessPoint>, setting information of the access point 91 is included. In the area between tags <title> and </title>, the name of the setting information (local-net) is indicated. In the area between tags <802.11b> and </802.11b>, setting information concerning 802.11b wireless communication, that is, ssid and the WEP private key, are indicated.

The ssid is indicated between tags <essid> and </essid>, and the WEP private key is indicated between tags <wepkey> and </wepkey>. In the example shown in FIG. 22, ssid is "0000", and the WEP private key is "sampl".

In step S246, the infrared communication controller 119 sends the supplied wireless-communication connection information shown in FIG. 22 to the personal computer 2 via the infrared communication port 94 by infrared communication.

In step S226, upon receiving the wireless-communication connection information via the infrared communication port 93, the infrared communication controller 101 of the personal computer 2 supplies the obtained wireless-communication connection information to the CPU 31.

In step S227, based on the wireless-communication connection information, the CPU 31 controls the wireless communication unit 102 to perform the setting of IEEE802.11b wireless communication. That is, the CPU 31 controls the wireless communication unit 102 to set the information, such as ssid and the WEP private key, required for making a connection request to the access point 91 by the wireless communication unit 102, based on the information obtained from the access point 91.

In the example shown in FIG. 22, the CPU 31 identifies that the setting information of the access point 91 is indicated in the area between tags <accessPoint> and </accessPoint>, and also identifies that the information, such as ssid and the WEP private key, is indicated in the area between tags <802.11b> and </802.11b>. The CPU 31 then extracts "0000" between tags <essid> and </essid> as ssid, and extracts "sampl" between tags <wepkey> and </wepkey> as the WEP private key. By using such information, the CPU 31 controls the wireless communication unit 102 to perform setting.

Upon completing the setting, the CPU 31 of the personal computer 2 controls the wireless communication unit 102 to send a connection request to the access point 91 by IEEE802.11b wireless communication.

In step S247, the wireless communication unit 121 of the access point 91 receives the connection request. Then, in step S248, the wireless communication unit 121 establishes IEEE802.11b wireless communication under the control of the CPU 111, and sends a message to the personal computer 2 by the established wireless communication.

In step S229, the wireless communication unit 102 of the personal computer 2 obtains the message. Then, in step S230, the wireless communication unit 102 establishes IEEE802.11b wireless communication under the control of the CPU 31.

When the personal computer 2 and the access point 91 are connected after establishing IEEE802.11b wireless communication, they complete the connection processing, and perform IEEE802.11b wireless communication.

As described above, the personal computer 2 is able to obtain the setting information concerning the connection of IEEE802.11b wireless communication from the access point 91 by infrared communication so as to access and connect to the access point 91 by using the information.

In IEEE802.11b wireless communication, the same information, such as ssid and the WEP private key, must be employed in two communicating parties. The setting of the personal computer 2 may be adjusted to the setting of the access point 91, as stated above. Conversely, the setting of the access point 91 may be adjusted to the setting of the personal computer 2.

Figure 23:
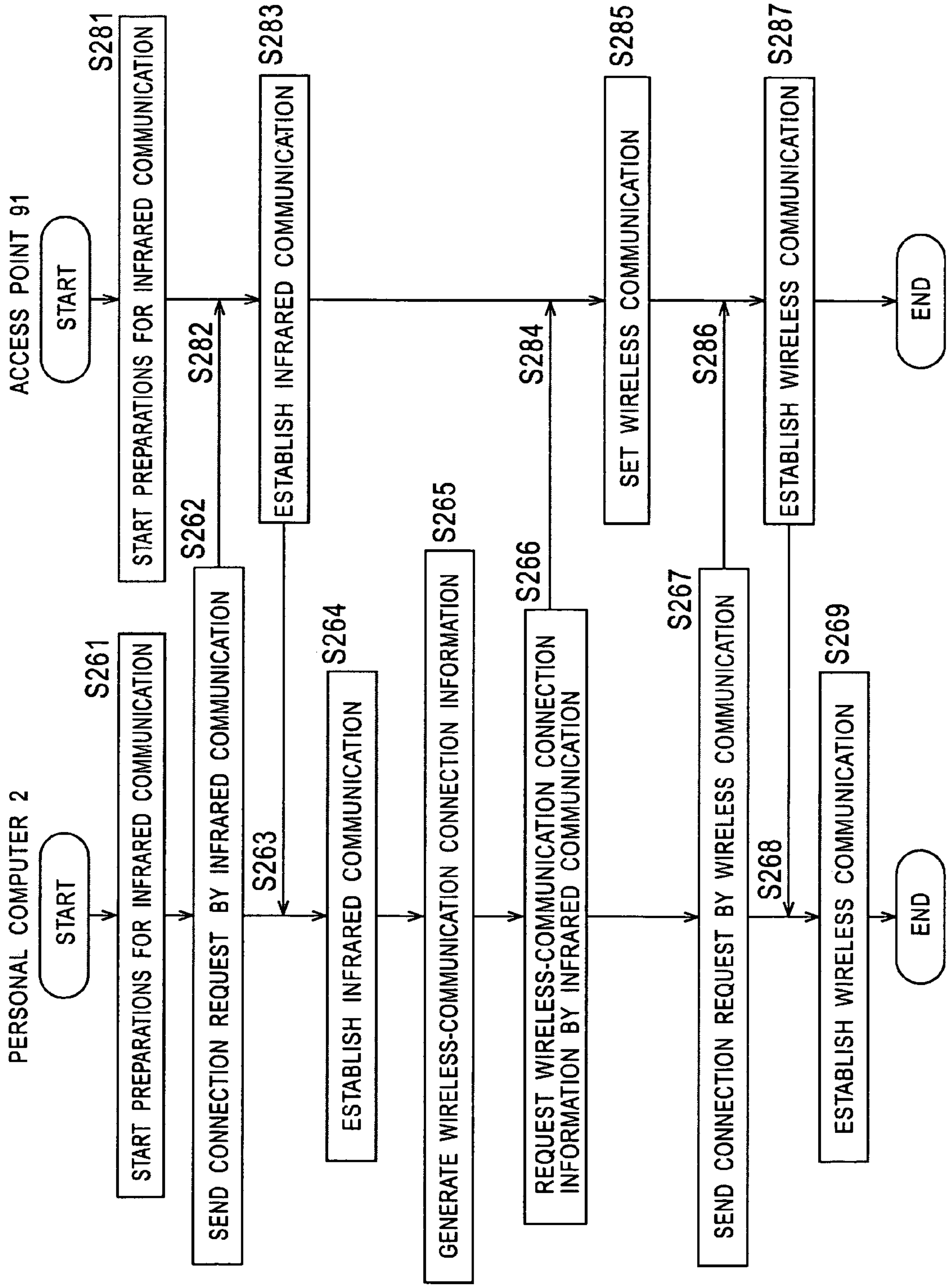
FIG. 23 is a flowchart illustrating another example of processing when the personal computer shown in FIG. 18 makes a connection request to the access point.

An example of the processing when the personal computer 2 supplies setting information to the access point 91 is described below with reference to the flowchart of FIG. 23.

Figure 21:
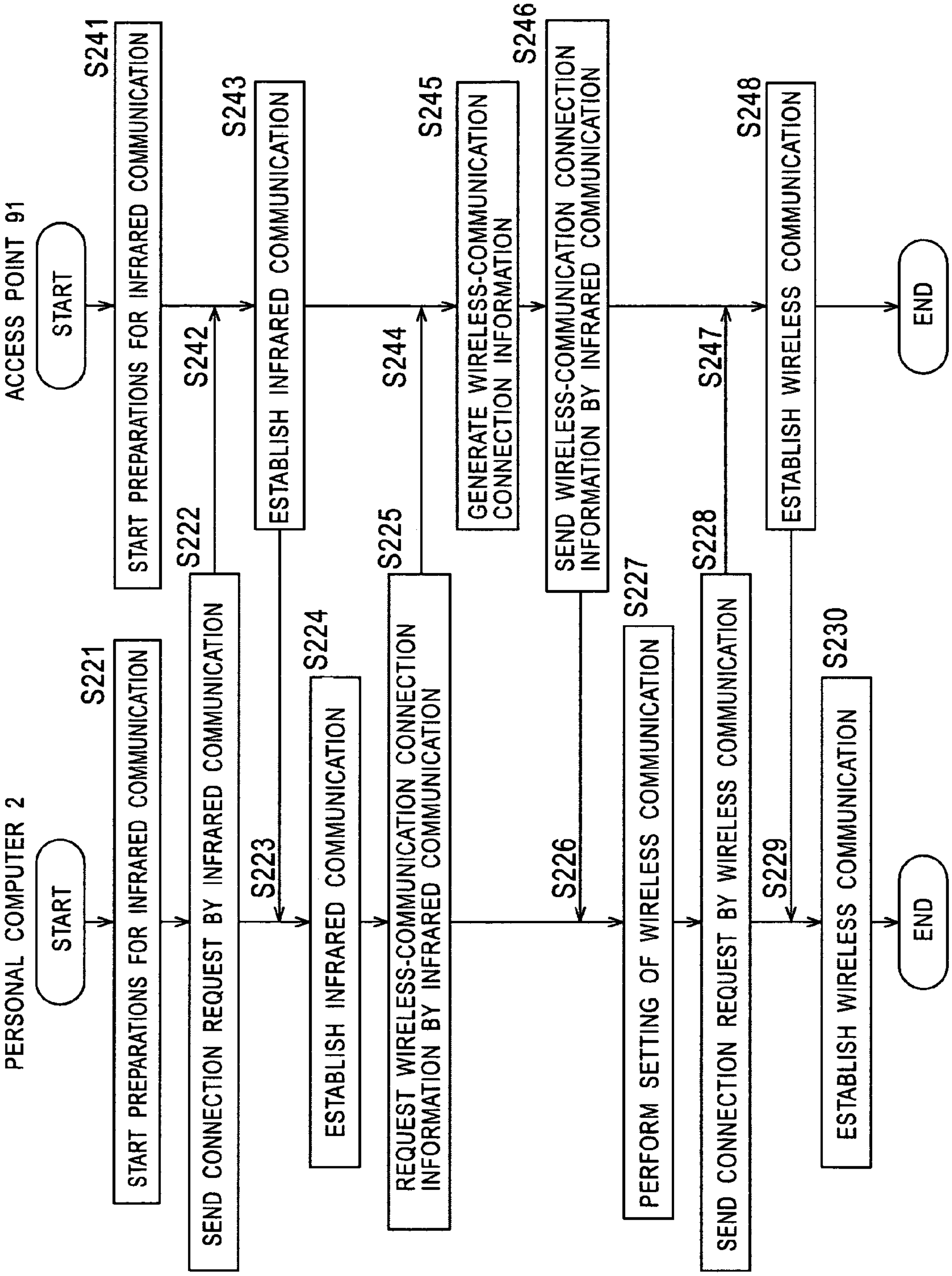
FIG. 21 is a flowchart illustrating an example of processing when the personal computer shown in FIG. 18 makes a connection request to the access point.

First, in step S261, the CPU 31 of the personal computer 2 requests the infrared communication controller 101 to start preparations for infrared communication based on an instruction from the user, as in step S221 of FIG. 21. Based on this request, the infrared communication controller 101 starts preparations for infrared communication using IrDA.

Similarly, in step S281, the infrared communication controller 119 of the access point 91 starts preparations for infrared communication using IrDA based on the request from the CPU 111, as in step S241 of FIG. 21.

Then, both the personal computer 2 and the access point 91 become ready to communicate with each other after completing preparations. In this case, in step S222, the infrared communication controller 101 of the personal computer 2 sends a connection request to the access point 91 located close to the personal computer 2 via the infrared communication port 93, as in step S222 of FIG. 21.

As in steps S242 and S243 of FIG. 21, in step S282, the infrared communication controller 119 of the access point 91 obtains the connection request via the infrared communication port 94, and then, in step S283, the infrared communication controller 119 establishes infrared communication by using IrDA, and sends a message to the personal computer 2.

As in steps S223 and S224 of FIG. 21, in step S263, the infrared communication controller 101 of the personal computer 2 obtains the message via the infrared communication port 93, and then, in step S224, the infrared communication controller 101 establishes infrared communication by using IrDA.

As described above, after establishing infrared communication, in step S265, the CPU 31 of the personal computer 2 obtains the information, such as ssid and the WEP private key, stored in the storage unit 38, generates wireless-communication connection information including information concerning IEEE802.11b wireless communication, and supplies the generated wireless-communication connection information to the infrared communication controller 101.

In step S266, the infrared communication controller 101 sends the wireless-communication connection information supplied from the CPU 31 to the access point 91 via the infrared communication port 93 by infrared communication.

In step S284, upon receiving the wireless-communication connection information via the infrared communication port 94, the infrared communication controller 119 of the access point 91 supplies the obtained wireless-communication connection information to the CPU 111.

In step S285, based on the wireless-communication connection information, the CPU 111 controls the wireless communication unit 121 to perform the setting of IEEE802.11b wireless communication. That is, the CPU 111 controls the wireless communication unit 121 to set the information, such as ssid and the WEP private key, required for connecting to the personal computer to perform wireless communication, based on the information obtained from the personal computer 2.

Upon completing the setting of wireless communication, in step S267, the CPU 31, of the personal computer 2 controls the wireless communication unit 102 to send a connection request to the access point 91 by IEEE802.11b wireless communication. In this case, the wireless communication unit 102 sends a connection request by using ssid and the WEP private key supplied to the access point 91 by infrared communication.

In step S286, the wireless communication unit 121 of the access point 91 receives the connection request. Then, in step S287, the wireless communication unit 121 establishes IEEE802.11b wireless communication under the control of the CPU 111 by using the set ssid and WEP private key, and sends a message to the personal computer 2 by the established wireless communication.

In step S268, the wireless communication unit 102 of the personal computer 2 obtains the message. In step S269, the wireless communication unit 102 establishes IEEE802.11b wireless communication under the control of the CPU 31.

When the personal computer 2 and the access point 91 are connected after establishing IEEE802.11b wireless communication, they complete the connection processing and perform IEEE802.11b wireless communication.

As described above, the personal computer 2 supplies setting information concerning the connection of IEEE802.11b wireless communication to the access point 91 by infrared communication, and allows the access point 91 to perform the setting. By using the setting information, the personal computer 2 can access and connect to the access point 91.

As a network model in IEEE802.11b wireless communication, network connection (infrastructure mode) implemented by IEEE802.11b wireless communication using the access point 91 has been discussed. However, instead of using a special communication facility, such as an access point, an AdHoc mode in which a network is formed of only terminals may be employed.

Figure 24:
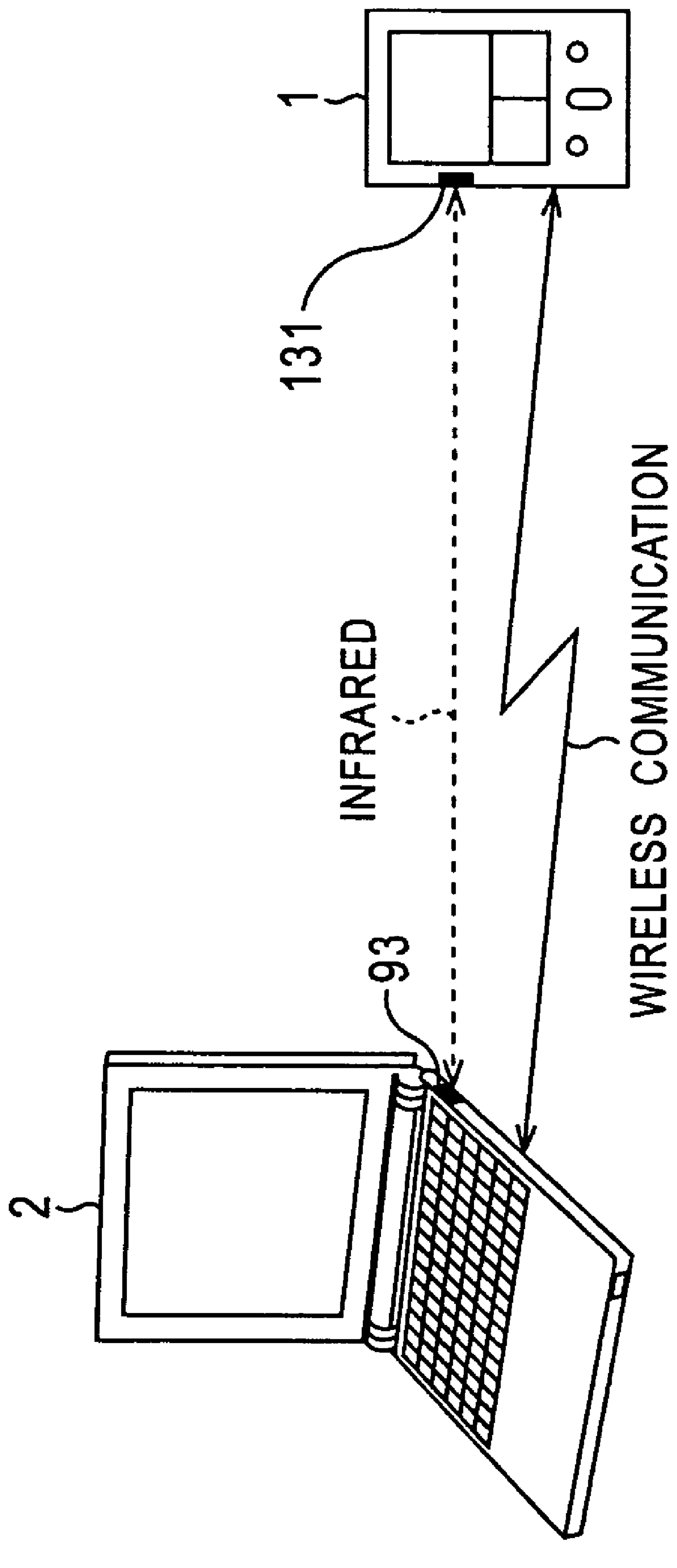
FIG. 24 illustrates the concept when a PDA and a personal computer send and receive various items of information and various commands via infrared communication.

FIG. 24 is a schematic view illustrating the concept when the personal computer 2 connects to the PDA in the AdHoc mode. Elements equivalent to those in FIGS. 3 and 19 are designated with like reference numerals, and an explanation thereof is thus omitted.

In FIG. 24, the PDA 1 is provided with an infrared communication port 131, and performs infrared communication with the personal computer 2 provided with the infrared communication port 93 and located in proximity with the PDA 1. The PDA 1 and the personal computer 2 have a function for performing IEEE802.11b wireless communication, and they perform wireless communication by radio waves.

Figure 25:
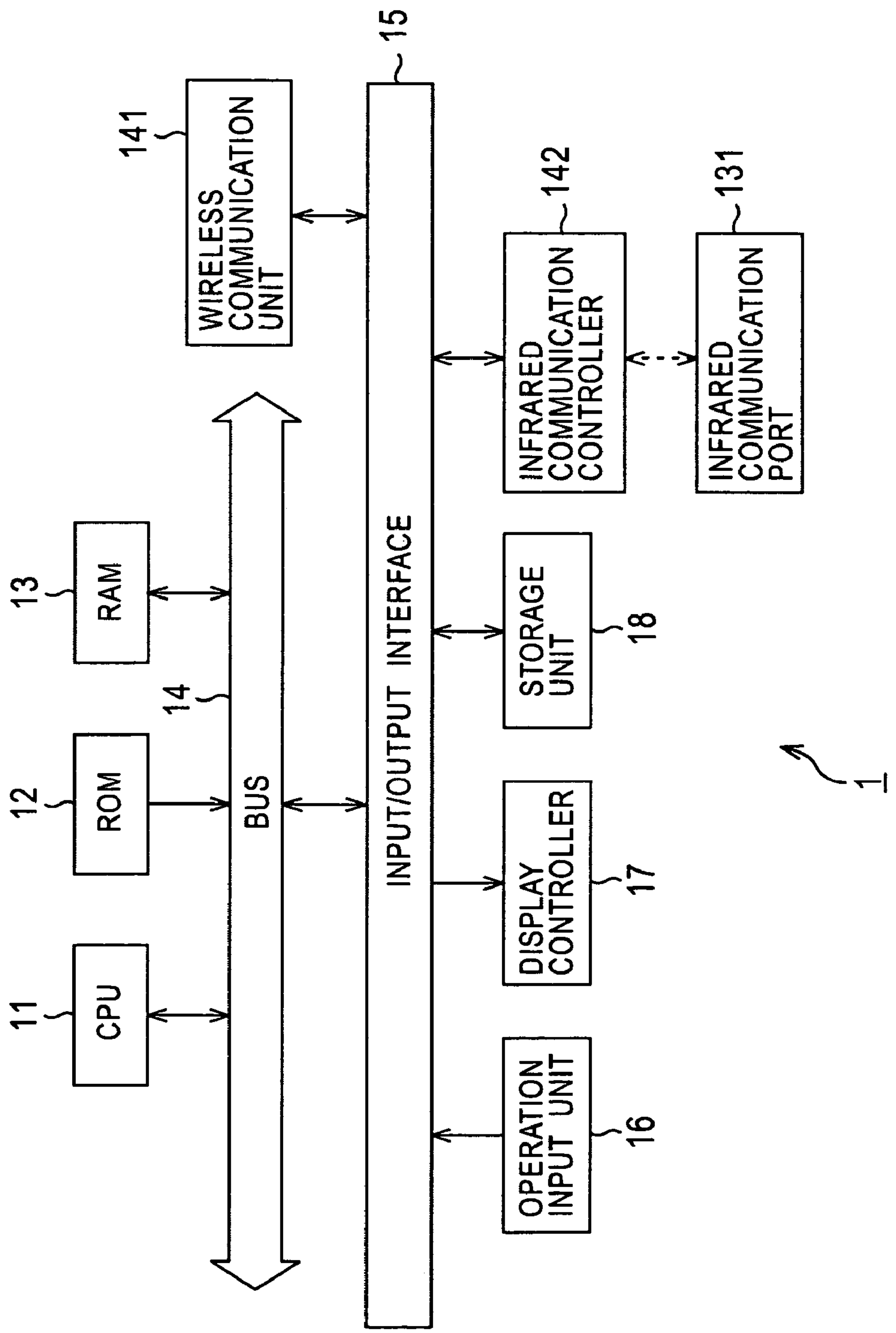
FIG. 25 illustrates an example of the internal configuration of the PDA shown in FIG. 24.

FIG. 25 illustrates an example of the internal configuration of the PDA 1 shown in FIG. 24. Elements equivalent to those in FIG. 2 are indicated by like reference numerals, and an explanation thereof is thus omitted.

In FIG. 25, an infrared communication controller 142 is connected to the input/output interface 15, and executes various types of processing based on a control signal supplied from the CPU 11 or response data sent from the infrared communication port 131.

For example, the CPU 11 generates a control command to be sent to the personal computer 2, and outputs it to the infrared communication controller 142 via the bus 14 and the input/output interface 15. The infrared communication controller 142 transmits a modulation wave in accordance with the command as an infrared signal via the infrared communication port 131, and sends various items of data to the personal computer 2 located in proximity with the PDA 1.

The infrared communication controller 142 also obtains data by demodulating an infrared signal supplied from the personal computer 2 via the infrared communication port 131, and supplies the data to the CPU 11 via the input/output interface 15 and the bus 14.

A wireless communication unit 141, which communicates with the personal computer 2 by using an IEEE802.11b wireless communication function, is also connected to the input/output interface 115.

It is now assumed, for example, that the personal computer 2 is to send a wireless-communication connection request to the PDA 1 so that they can be connected in the AdHoc mode, as shown in FIG. 24. In this case, as in the infrastructure mode described with reference to FIG. 18 (with reference to the flowchart of FIG. 21), the personal computer 2 performs infrared communication with the PDA 1 located close to the personal computer 2, obtains setting information, such as ssid and a WEP private key, from the PDA 1, and sends a connection request to the PDA 1 by IEEE802.11b wireless communication based on the setting information.

FIG. 26 illustrates an example of wireless-communication connection information supplied from the PDA 1 to the personal computer 2 by infrared communication. In FIG. 26, in order to provide the extendability and the general versatility, the information for connecting to the PDA 1 by IEEE802.11b wireless communication, such as ssid and the WEP private key, is described in XML format.

Basically, this wireless-communication connection information is configured similarly to that shown in FIG. 22. However, since the setting information shown in FIG. 26 is for the adhoc mode, tags <localNetwork> and </localNetwork> are used instead of tags <accessPoint> and </accessPoint>.

Accordingly, in the example shown in FIG. 26, the CPU 31 of the personal computer 2 identifies that the setting information of a communicating device, i.e., the PDA 1, is indicated in the area between the tags <localNetwork> and </localNetwork>. The CPU 31 thus extracts "0000" between tags <essid> and </essid> as the ssid, and extracts "sampl" between tags <wepkey> and </wepkey> as the WEP private key. The CPU 31 then controls the wireless communication unit 102 to perform setting by using the extracted information so as to implement connection in the AdHoc mode.

In the AdHoc mode as well as in the infrastructure mode, the same information, such as ssid and a WEP private key, must be employed in two communicating parties. The setting of the personal computer 2 may be adjusted to the setting of the access point 91, as discussed above. Conversely, the setting of the access point 91 may be adjusted to the setting of the personal computer 2, in which case, the processing is similar to that described with reference to the flowchart of FIG. 23.

In the foregoing description, the personal computer 2 makes a connection request to the PDA 1. However, the PDA 1 may make a connection request to the personal computer 2.

Although command data described in XML format is sent, another format, for example, Base64, may be used to encode command data and send it.

Moreover, communication is performed between the PDA 1 and the personal computer 2. However, the present invention is not restricted to these devices, and is widely applicable to electronic devices, for example, cellular telephones, digital video cameras, and television receivers.

The above-described series of processings can be executed by hardware or software. If software is used for executing the processings, programs forming the software are installed via a network or a recording medium into a computer built into dedicated hardware or into a general-purpose computer which can implement various functions by installing various programs.

This recording medium, which records the program to be installed into a computer and to become executable by the computer, may be formed of, as shown in FIG. 3, package media consisting of the magnetic disk 51 (including a floppy disk), the optical disc 52 (including a CD-ROM (Compact Disk-Read Only Memory), and a DVD (Digital Versatile Disc)), the magneto-optical disk 53 (including MD (Mini-Disc) (registered trade name)), or the semiconductor memory 54. Alternatively, the recording medium may be formed of the ROM 32 or the storage unit 38 in which the program is temporarily or permanently stored. The program is recorded in a recording medium by using a cable or wireless communication medium, such as a network, for example, a public line network, a local area network, or the Internet, or digital satellite broadcasting, via an interface, such as a router or a modem, if necessary.

In this specification, the steps of the programs stored in the recording medium may include processing executed in a time-series manner according to the order included therein, and may also include processing executed concurrently or individually.

INDUSTRIAL APPLICABILITY

According to the first invention, various types of control can be automatically performed without the need to perform a specific operation on a communicating device.

According to the first invention, without directly operating a communicating device in which wireless communication is not established, the communicating device can be controlled by sending predetermined command data via an electromagnetic wave.

According to the second invention, various types of control can be automatically performed without the need to perform a specific operation on a communicating device.

According to the second invention, without directly operating a communicating device in which wireless communication is not established, the communicating device can be controlled by sending and receiving a memory card in which predetermined command data is stored.

According to the third invention, without directly operating a communicating device in which wireless communication is not established, setting information of the communicating device can be easily obtained, and setting required for network connection can be performed.

According to the fourth invention, without directly operating a communicating device in which wireless communication is not established, setting required for network connection to the communication device can be easily performed.

The invention claimed is:

1. A first communication apparatus for performing short range wireless communication with a second communication apparatus located in proximity with said first communication apparatus via an electromagnetic wave and for performing long range wireless communication with the second communication apparatus, the first communication apparatus comprising:

detection means for detecting the presence of the second communication apparatus;

acquiring means for acquiring, via the short range wireless communication, information for establishing long range wireless communication on the second communication apparatus;

sending means for sending, to the second communication apparatus via the short range wireless communication, command data for starting long range wireless communication on the second communication apparatus;

receiving means for receiving response data sent from the second communication apparatus in response to the command data; and establishing means for establishing long range wireless communication with the second communication apparatus based on the information.

2. A first communication apparatus according to claim 1, wherein the command data includes command data for controlling a predetermined function of said second communication apparatus or command data for obtaining a state of a predetermined function.

3. A first communication apparatus according to claim 1, wherein the response data includes information concerning the state of a predetermined function of said second communication apparatus.

4. A first communication apparatus according to claim 1, wherein the command data is data described in XML format.

5. A communication method for use in a first communication apparatus for performing short range wireless communication with a second communication apparatus located in proximity with said first communication apparatus via an electromagnetic wave and for performing long range wireless communication with the second communication apparatus, the method comprising:

detecting the presence of the second communication apparatus;

acquiring, via the short range wireless communication, information for establishing long range wireless communication on the second communication apparatus;

sending, to the second communication apparatus via the short range wireless communication, command data for starting long range wireless communication on the second communication apparatus;

receiving response data sent from the second communication apparatus in response to the command data; and establishing long range wireless communication with the second communication apparatus based on the information.

6. A recording medium having a computer-readable program for causing a first communication apparatus to perform a short range wireless communication method to communicate with a second communication apparatus located in proximity with said first communication apparatus via an electromagnetic wave and to perform long range wireless communication with the second communication apparatus, said method comprising:

detecting the presence of the second communication apparatus;

acquiring, via the short range wireless communication, information for establishing long range wireless communication on the second communication apparatus;

sending, to the second communication apparatus via the short range wireless communication, command data for starting long range wireless communication on the second communication apparatus receiving response data sent from the second communication apparatus in response to the command data; and establishing long range wireless communication with the second communication apparatus based on the information.

7. A first communication apparatus for performing short range wireless communication with a second communication apparatus according to a predetermined wireless communication standard and for performing long range wireless communication with the second communication apparatus, the first communication apparatus comprising:

first obtaining means for obtaining information for establishing long range wireless communication on the second communication apparatus;

reading means for reading the information;

writing means for writing the information into a storage medium;

transmitting means for transmitting, via the short range wireless communication, the information to the second communication apparatus; and establishing means for establishing long range communication with the second communication apparatus in response to command data from the second communication apparatus.

8. A first communication apparatus according to claim 7, wherein the command data includes command data for controlling a predetermined function of said second communication apparatus or command data for obtaining a state of a predetermined function.

9. A first communication apparatus according to claim 7, wherein the predetermined command data is data described in XML format.

10. A first communication apparatus according to claim 7, wherein the storage medium is a memory card.

11. A communication method for use in a first communication apparatus for performing wireless communication with a second communication apparatus according to a wireless communication standard, the method comprising:

obtaining information for establishing long range wireless communication on the second communication apparatus;

reading the information;

writing the information into a storage medium;

transmitting, via short range wireless communication, the information to the second communication apparatus; and establishing lone range communication with the second communication apparatus in response to command data from the second communication apparatus.

12. A recording medium having a computer-readable program for causing a first communication apparatus to perform a wireless communication method to communicate with a second communication apparatus according to a wireless communication standard, said method comprising:

obtaining information for establishing long range wireless communication on the second communication apparatus;

reading the information;

writing the information into a storage medium;

transmitting, via short range wireless communication, the information to the second communication apparatus; and establishing long range communication with the second communication apparatus in response to command data from the second communication apparatus.

* * * * *

UNITED STATES PATENT AND TRADEMARK OFFICE

CERTIFICATE OF CORRECTION

PATENT NO. : 7,336,926 B2
APPLICATION NO. : 10/468275
DATED : February 26, 2008
INVENTOR(S) : Takuro Noda and Makoto Sato It is certified that error appears in the above-identified patent and that said Letters Patent is hereby corrected as shown below:

In claim 11, column 27, line 6, "lone" should read --long--

Signed and Sealed this

Nineteenth Day of May, 2009

John Doll

JOHN DOLL
*Acting Director of the United States Patent and Trademark Office*